United States Patent [19]

Kadowaki et al.

[11] Patent Number: 4,538,044
[45] Date of Patent: Aug. 27, 1985

[54] APPARATUS FOR ASSEMBLING MOTORCAR BODY

[75] Inventors: Satoshi Kadowaki; Yuzi Ikeda, both of Sayama, Japan

[73] Assignee: Honda Giken Kogyo Kabushiki Kaisha, Tokyo, Japan

[21] Appl. No.: 564,618

[22] Filed: Dec. 22, 1983

[30] Foreign Application Priority Data

Dec. 22, 1982 [JP] Japan .................................. 57-223859
Dec. 22, 1982 [JP] Japan .................................. 57-223860
Dec. 25, 1982 [JP] Japan .................................. 57-226539

[51] Int. Cl.³ .......................... B23K 37/04; B23K 9/12
[52] U.S. Cl. ........................................ 219/80; 219/79; 219/86.24; 228/47
[58] Field of Search ............... 219/79, 80, 86.24, 86.7, 219/158, 161; 228/47

[56] References Cited

U.S. PATENT DOCUMENTS 3,288,978 12/1966 Trygar .................................. 219/80
4,256,947 3/1981 De Candia ........................... 219/79
4,404,451 9/1983 Niikawa et al. ...................... 219/80

Primary Examiner—Roy N. Envall, Jr.
Assistant Examiner—C. M. Sigda
Attorney, Agent, or Firm—Armstrong, Nikaido, Marmelstein & Kubovcik

[57] ABSTRACT

Apparatus for assembling a motorcar body from the component parts of a floor panel, a roof panel and side panels. A set carrier can reciprocate between a setting station and a welding station having a welding jig mechanism including welders. The set carrier has floor panel holding members for positioning and holding the floor panel and side panel holding members for pressing the side panels against and fixing the side panels to the floor panel, with the roof panel solely being held between receiving upper edges of the side panels. The thus-formed and held predetermined car body framework is conveyed to the welding station on the set carrier and is there transferred as-is to the welding jig mechanism to be welded.

7 Claims, 29 Drawing Figures

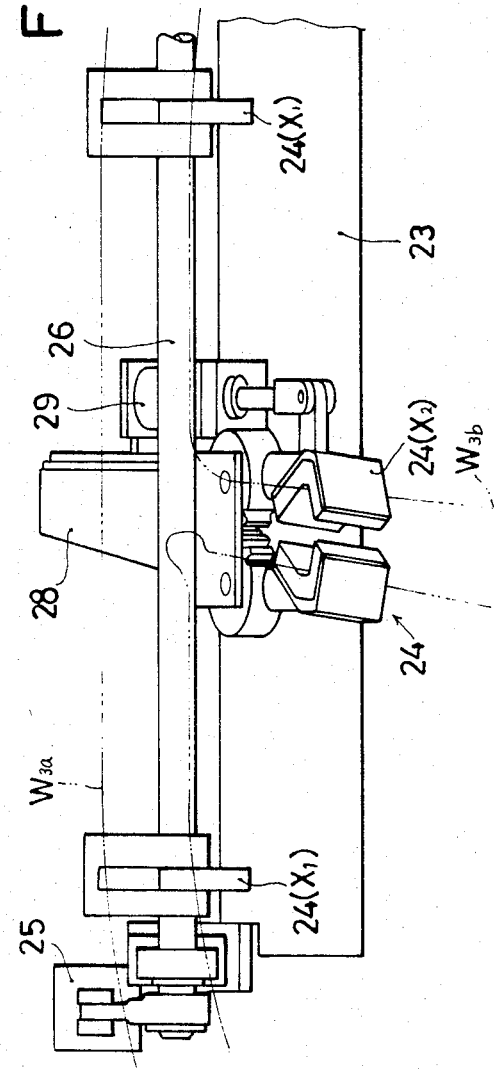
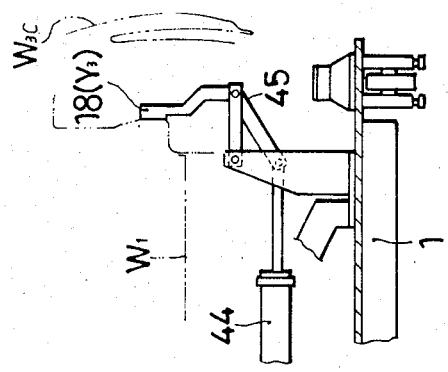
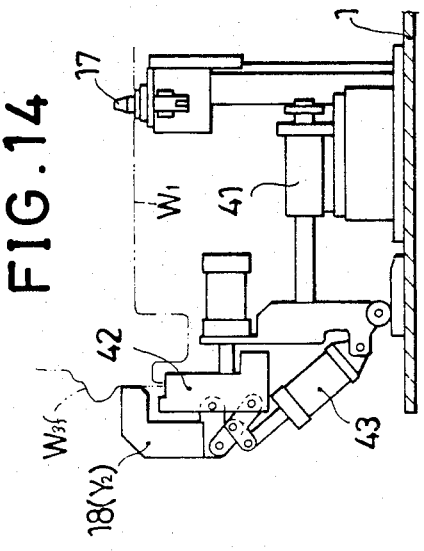
FIG. 9
FIG. 15
FIG. 14
FIG. 13

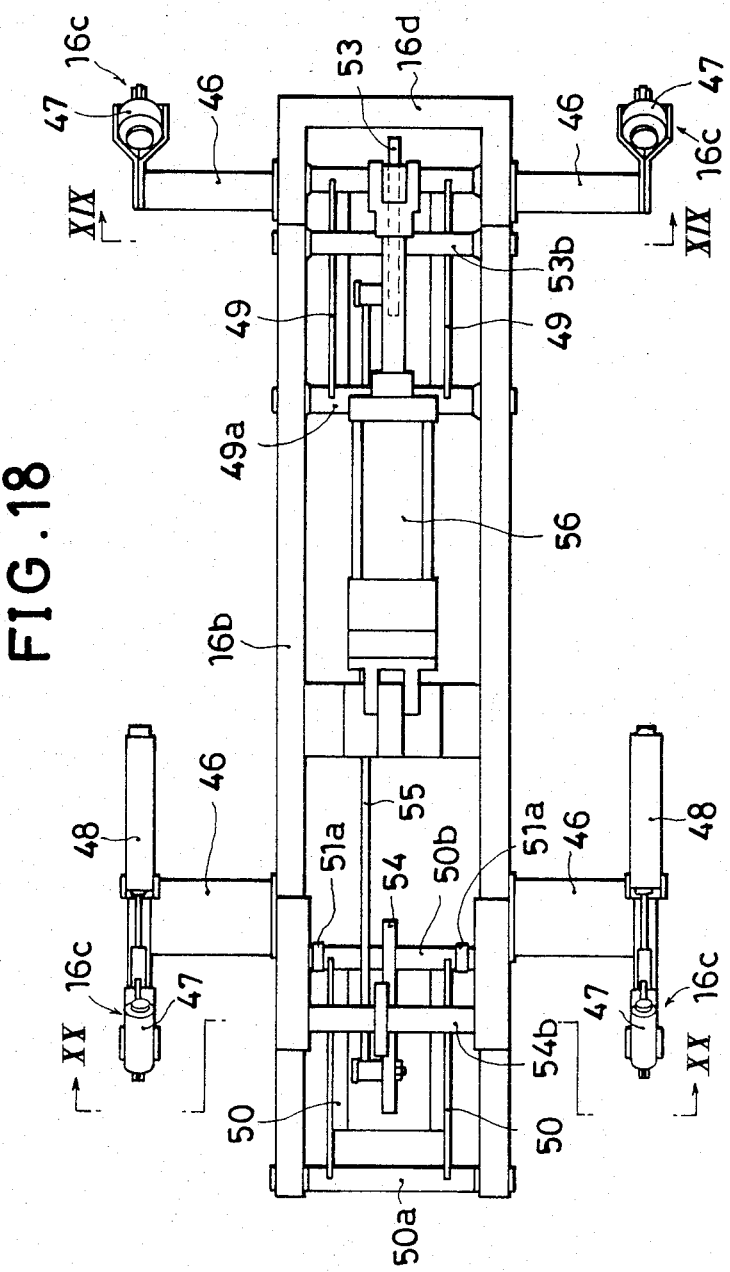

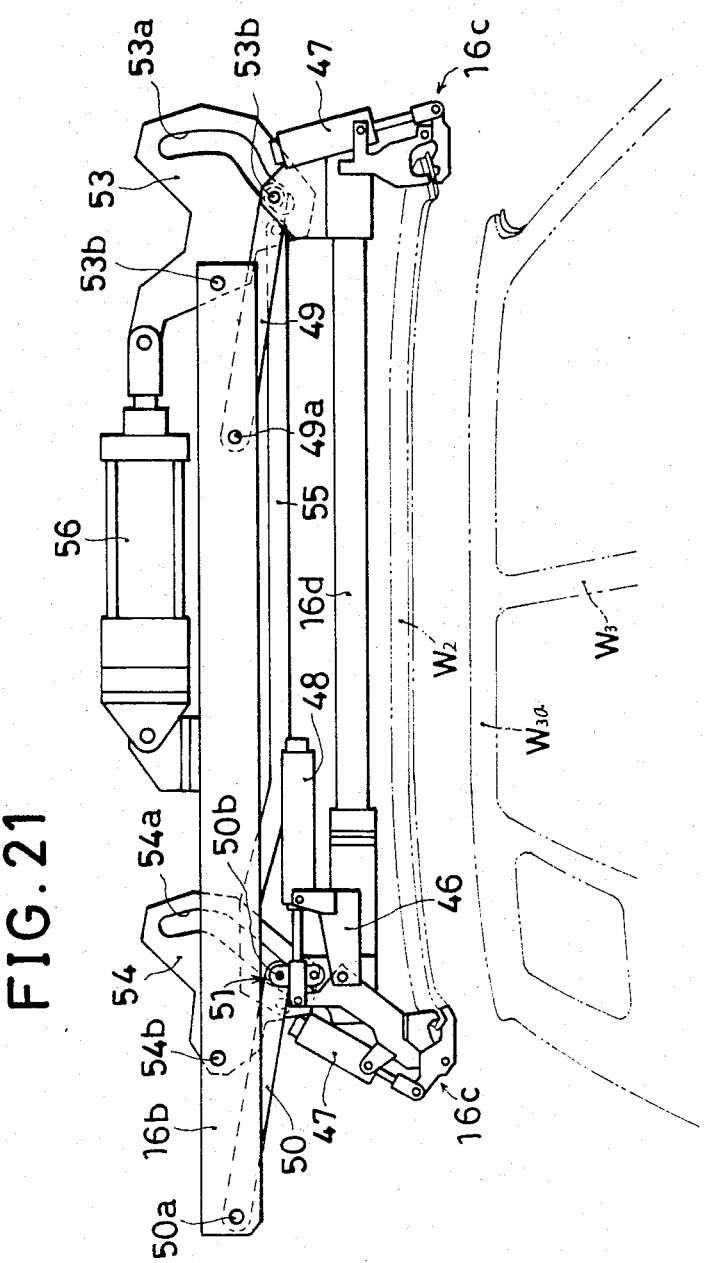

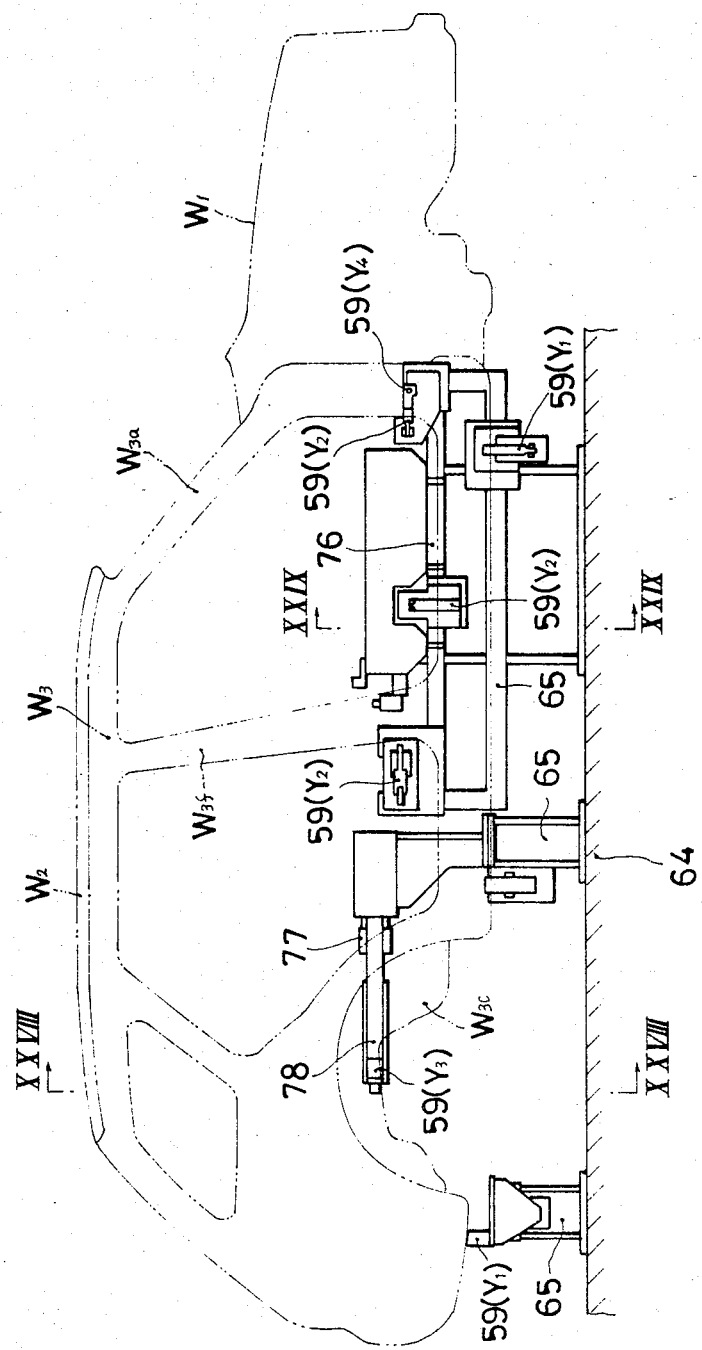

4,538,044

APPARATUS FOR ASSEMBLING MOTORCAR BODY

DETAILED EXPLANATION OF INVENTION

This invention relates to a motorcar body assembling apparatus in which side panels on both sides are combined with and are connected by welding to a floor panel and a roof panel to obtain an assembled motorcar body.

An example of a known assembly and welding apparatus is disclosed in U.S. Pat. No. 4,404,451 and is shown in FIGS. 1 and 2. The apparatus includes a set carrier a for setting panels which is able to reciprocate between a setting station A and a welding station B in front thereof. Welding station B is provided on both sides thereof with a pair of welding jig means b, b. Floor panel $W_1$ and a roof panel $W_2$ are set, at the setting station A, on respective holding members c,d provided on the set carrier a and are conveyed to the welding station B. The welding jig means b on each side is arranged to be turnable between its inwardly facing posture and its outwardly facing posture so that a side panel $W_3$ previously set on each welding jig means b in its outwardly facing posture may be joined with and connected by welding to the floor panel $W_1$ and the roof panel $W_2$ by turning the welding jig means b to its inwardly facing posture.

This apparatus, however, is inconvenient in that a new side panel $W_3$ cannot be set on the welding jig means b before the welding operation on the previously provided side panel is completed. Even if the apparatus is operated so that the set carrier a is moved back to the setting station A while the floor panel $W_1$ and the roof panel $W_2$ are held and welded by welding guns e provided on the welding jig means b,b, and while a new floor panel $W_1$ and a new roof panel $W_2$ are set on the set carrier a and are ready for the next welding operation, the setting of new side panels $W_3$ requires comparatively much time. This hinders improvement in working efficiency or productivity.

For removing this inconvenience, plural set carriers can be arranged to be circulated in a loop so that the welding operation and the side panel setting operation may be carried out at the same time using circulating set carriers. This arrangement however, however, is inconvenient in that the amount of floor space necessary for installing such a looped line is increased. Also, the cost for installation is increased.

OBJECT AND SUMMARY OF THE INVENTION

This invention has for its object to provide an apparatus free from those inconveniences, in which side panels, a floor panel and a roof panel are conveyed to a welding station with panels being set in a predetermined car body framework on a set carrier and are then transferred to welding jig means and are connected together by welding. During the welding, the set carrier is moved back to the setting station so that the setting of new panels on the set carrier may be carried out. As a result, an assembled motorcar body can be formed at a high efficiency, without carrying out a setting operation of a side panel on each side by a welding jig means after the completion of welding operation as is carried out in the conventional apparatus. Namely, according to this invention, in a motorcar body assembling apparatus of the type that a set carrier is provided to reciprocate between a setting station and a welding station in front thereof, with the welding station being provided on both sides thereof with welding jig means for connecting by welding both side panels to a floor panel and a roof panel, the invention characterized in that the set carrier is provided with floor panel holding members for positioning and supporting the floor panel, and with side panel holding members for pressing against and fixing the side panels to the floor panel under the condition that the roof panel is held between upper receiving edges of the side panels so that the side panels, the roof panel and the floor panel may be conveyed from the setting station to the welding station as a predetermined car body framework of those panels set on the set carrier, and may be then transferred, so they are in such a car body framework, to the welding jig means at the welding sta- tion.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 9 is a view of a lifter means of the present invention, as viewed from line IX—IX in FIG. 8.

FIG. 11 is a top plan view of a set carrier, FIGS. 13 to 15 are front views showing various types of side panel holding members provided on the set carrier, FIG. 18 is a top plan view thereof, FIG. 27 is a side view thereof viewed from the line XXVII—XXVII in FIG. 26, and FIGS. 28 and 29 are sectional views taken along the lines XXVIII—XXVIII and XXIX—XXIX in FIG. 27.

DETAILED DESCRIPTION OF PREFERRED EMBODIMENTS

Figure 1:
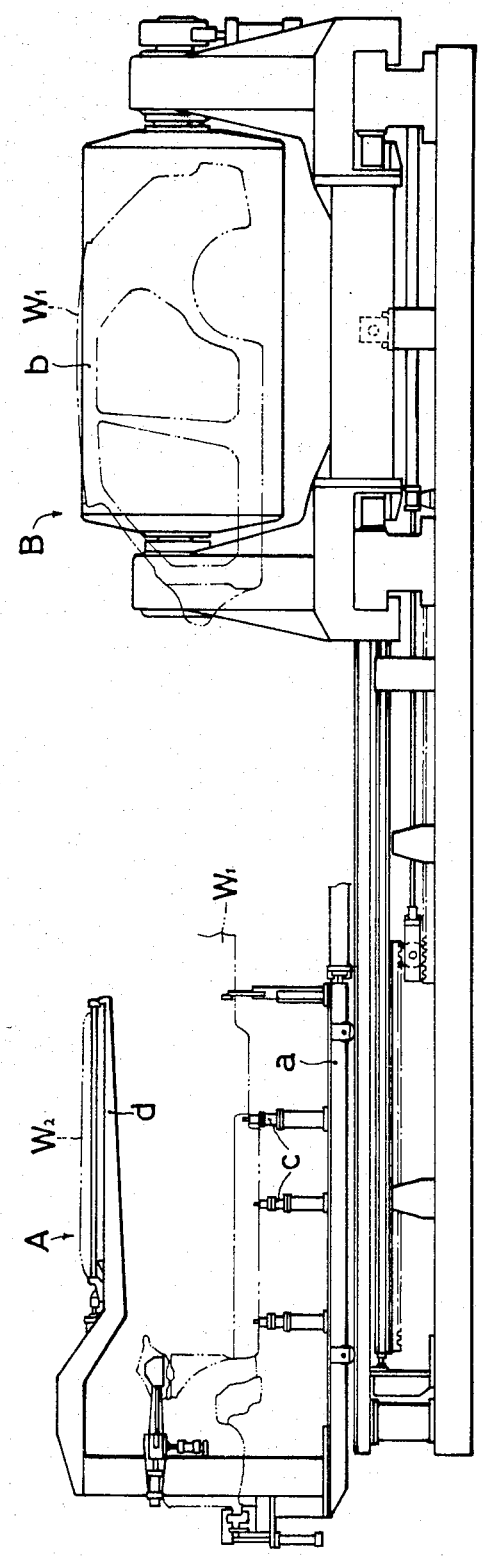
FIG. 1 is a side view of a conventional assembly-welding apparatus.
Figure 2:
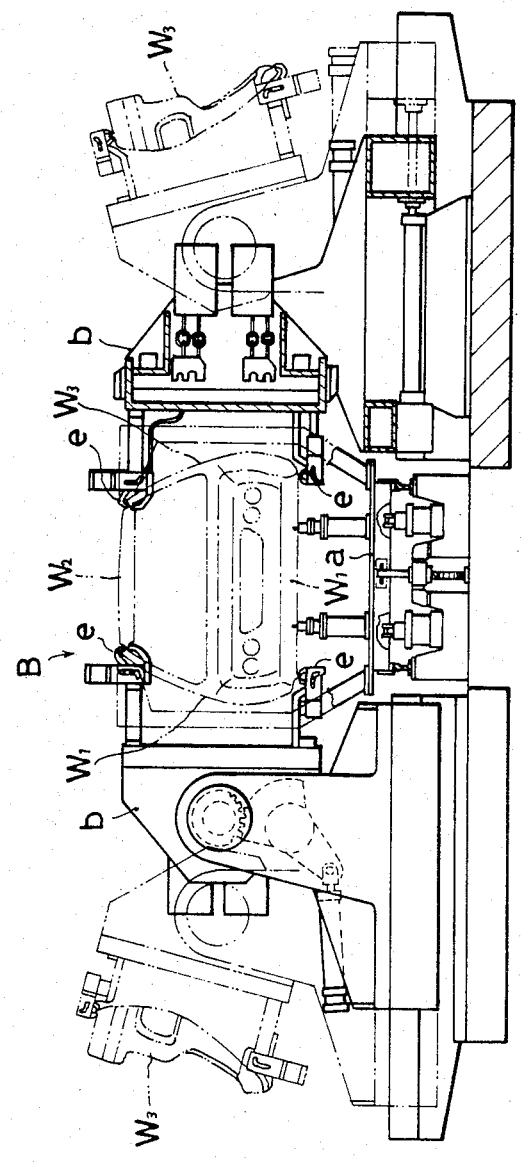
FIG. 2 is a front view, partly in section, of a conventional welding means portion thereof.
Figure 3:
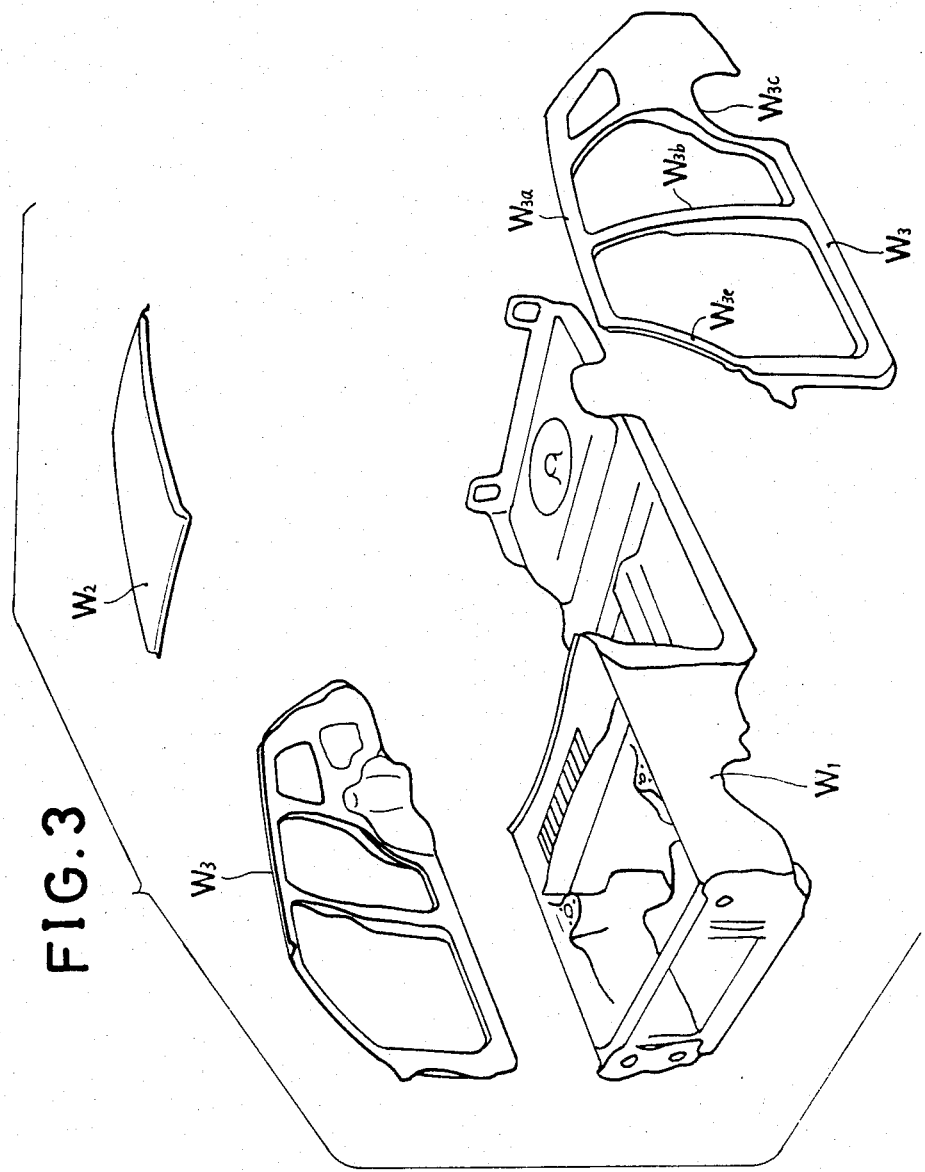
FIG. 3 is an exploded perspective view of a motorcar body which is to be assembled by using the present invention, FIG. 4 a top plan view of a first embodiment of this invention.

This invention will be explained with reference to the embodiment shown in FIG. 4 with which a floor panel $W_1$ and a roof panel $W_2$ for a motorcar body, as shown in FIG. 3, are combined with side panels $W_3$, $W_3$ on both sides thereof and are then connected thereto by welding for obtaining an assembled motorcar body.

Referring to the drawings, a set carrier 1 is able to reciprocate between a setting station A and a welding station B in front thereof. A welding jig means 2 is provided on each of the right and left sides of the welding station B.

Figure 6:
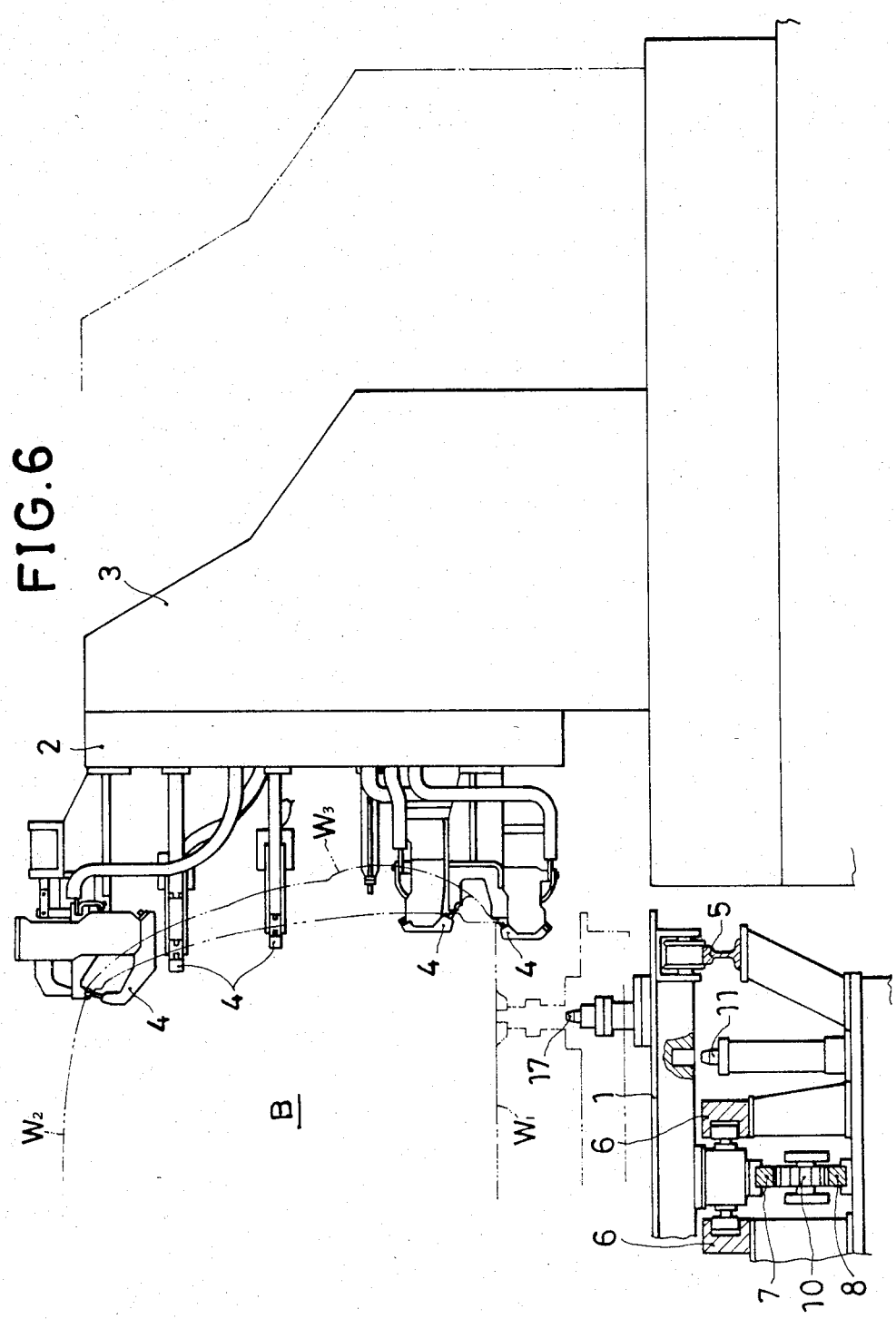

As shown clearly in FIG. 6, each welding jig means 2 is mounted on a supporting base 3 which is movable in the lateral direction to advance and retreat inwards and outwards. At its advanced inward position, the side panel $W_3$ side is clamped together with a floor panel $W_1$ and the roof panel $W_2$ and the panels are welded together by welding guns 4 provided thereon.

Figure 4:
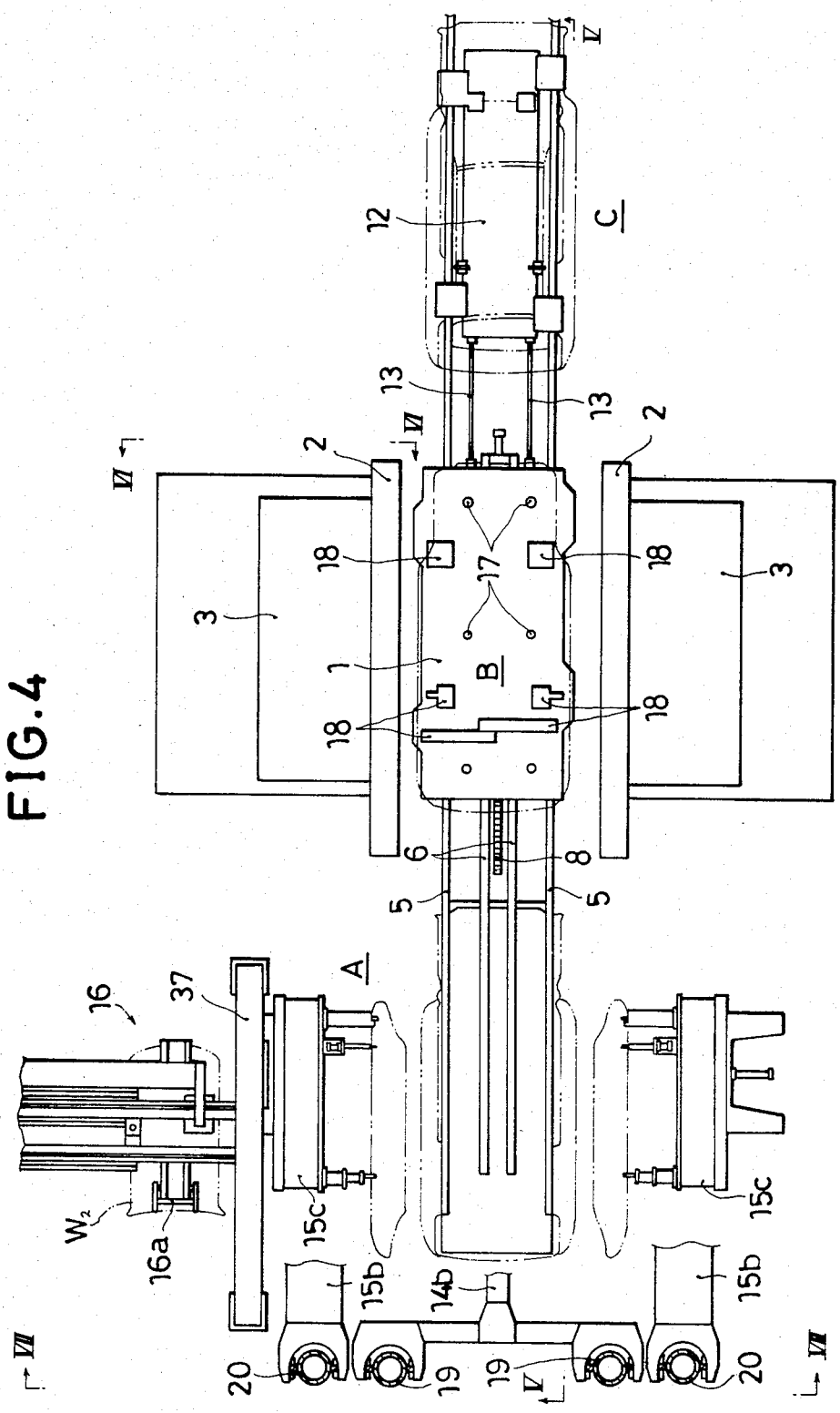
Figure 5:
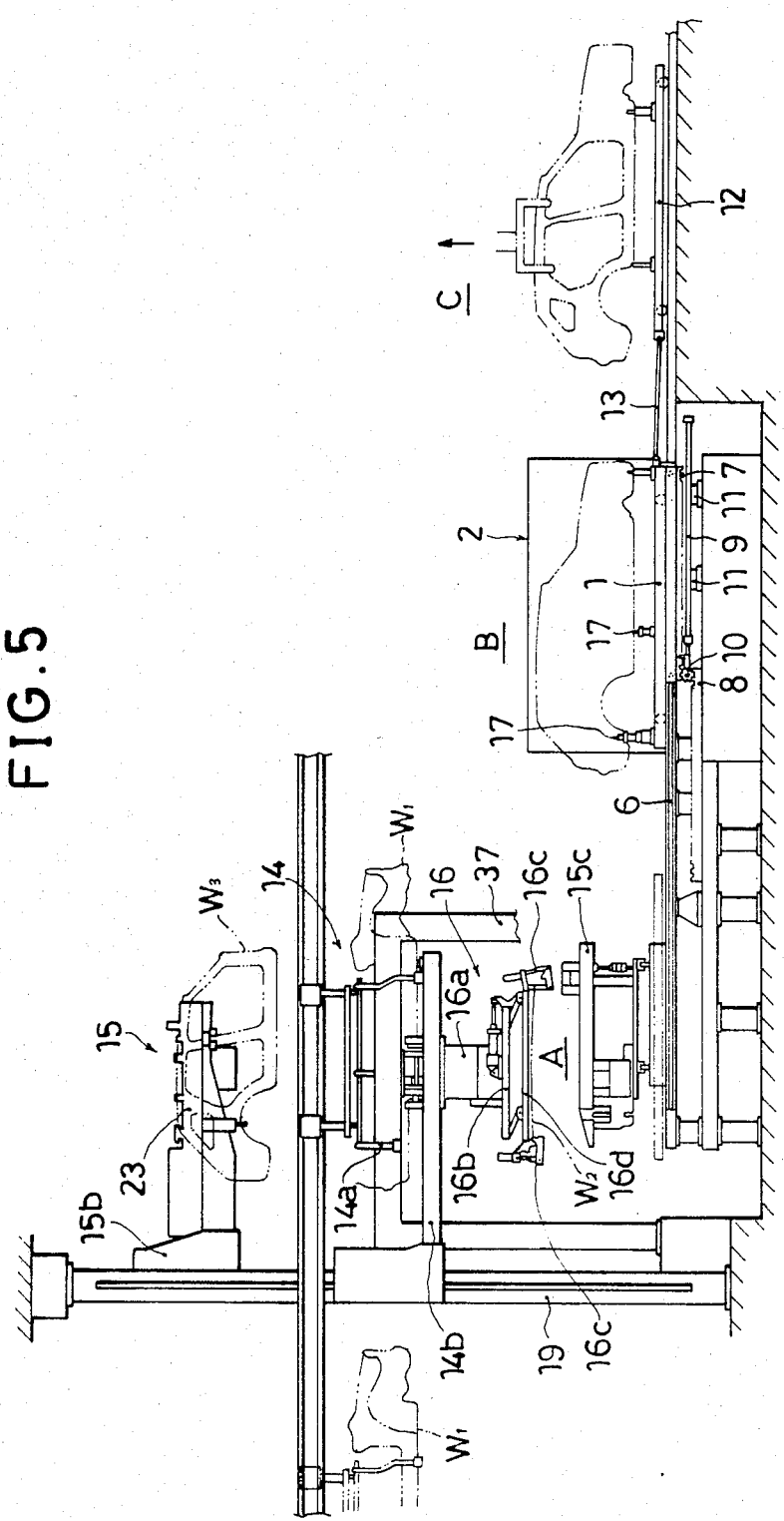
FIGS. 5, 6 and 7 are respective views viewed from the lines V—V, VI—VI and VI—VII in FIG. 4.

A set carrier 1 is supported movably on a pair of right and left rails 5, 5 provided along a line extending between the setting station A and the welding station B (FIG. 4). As shown in FIG. 5 and FIG. 6, a first rack bar 7 is mounted slidably along on a pair of right and left guide rails 6, 6 between the two rails 5,5. A second rack bar 8 is positioned below the first rack bar 7 and fixed to a supporting base. A pinion 10 is arranged to move along the longitudinal axis of the rails by an operation cylinder 9. The pinion 10 is interposed between and is brought into engagement with the two rack bars 7, 8. The set carrier 1 is detachably engaged, at its lower surface, with the first rack bar 7. When the cylinder 9 is operated, the set carrier 1 is reciprocated between the setting station A and the welding station B by the interengagement of the pinion 10, the first rack bar 7 and the second rack bar 8. When the set carrier 1 is moved to the welding station B, the set carrier 1 may be elevated to a predetermined height position as shown by dotted lines in FIG. 6 by plural elevating positioning pins 11 provided at the welding station B.

A discharging carrier 12 is provided to reciprocate between the welding station B and a discharging station C in front thereof. The discharging carrier 12 is connected to the set carrier 1 through a connecting rod 13, as shown in FIG. 5 so that it moves between the welding station B and the discharging station C synchronously with the reciprocative movements of the set carrier 1.

There are provided at the setting station A an introducing means 14 for the floor panel $W_1$, an introducing means 16 for the roof panel $W_2$ and an introducing means 15 for the side panels $W_3$, $W_3$. Additionally, according to this invention, there are provided on the set carrier 11 not only floor panel holding member 17 such as positioning pins or the like for positioning the floor panel $W_1$ by fitly inserting into drain openings or the like made in the floor panel $W_1$, but also side panel holding members 18 for pressing against and fixing the side panels $W_3$ to the floor panel $W_1$ on each side.

Figure 7:
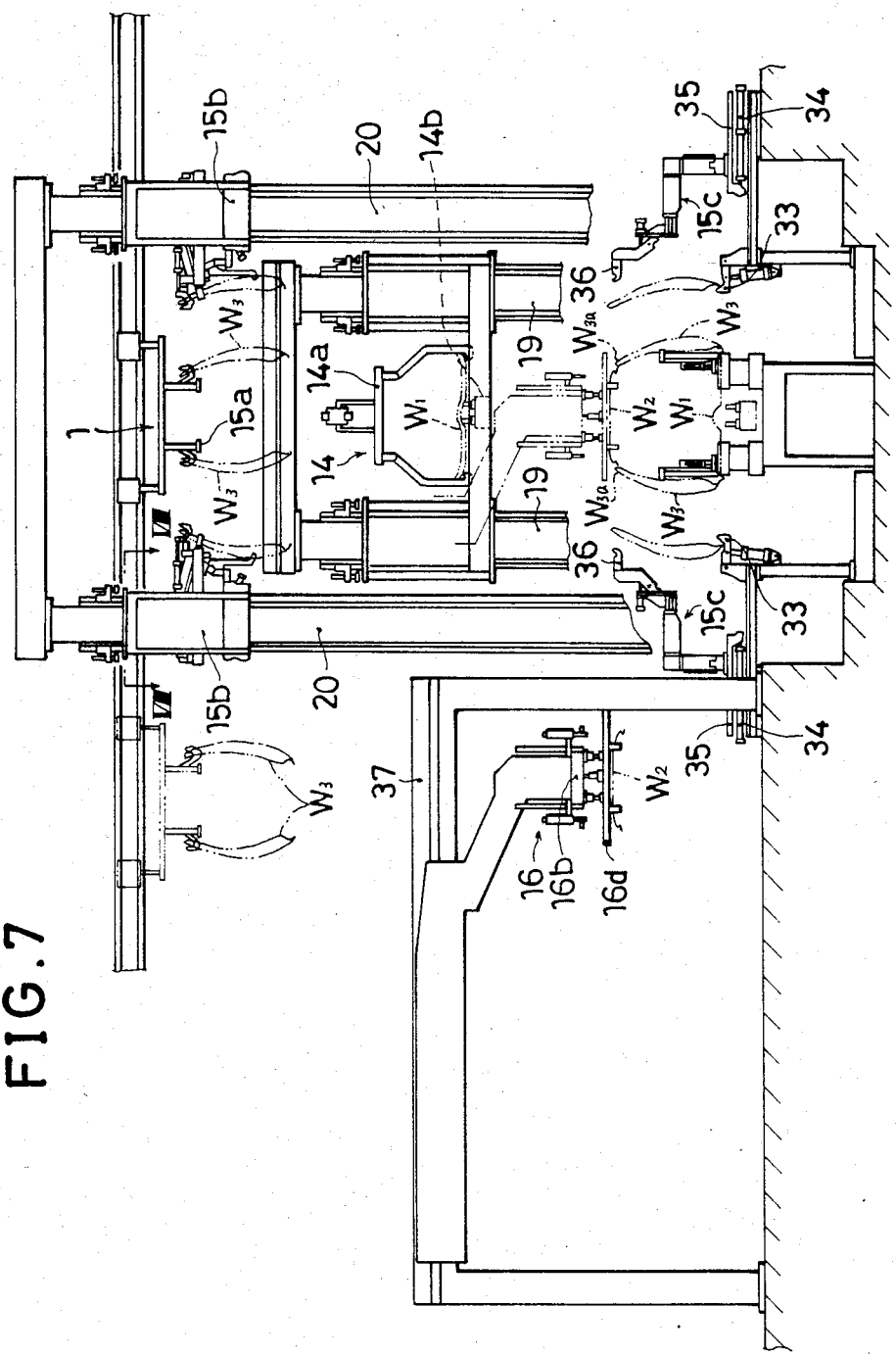

The introducing means 14 for the floor panel operates to load the floor panel $W_1$ from above onto the holding members 17 on the set carrier 1. More in detail, as shown in FIGS. 4, 5 and 7, for instance, the introducing means 14 comprises a hanger means 14a for introducing the floor panel $W_1$ from the rear into a position located above the setting station A, and a drop lifter means 14b for receiving the floor panel $W_1$ from the hanger means 14a and loading the same onto the holding members 17 on the set carrier 1. The lifter means 14b is supported on supporting right and left posts 19, 19 provided in the rear of the setting station A and is movable upwards and downwards.

The introducing means 15 for the side panels is constructed for setting the side panels $W_3$, $W_3$ on both sides in position combined with the floor panel $W_1$ on both lateral sides of the set position of the floor panel $W_1$. More in detail, the introducing means 15 comprises a hanger means 15a for introducing a pair of side panels $W_3$, $W_3$ to a position above the setting station A from one lateral side thereof, a pair of drop lifter means 15b, 15b for receiving the respective panels $W_3$, $W_3$ from the foregoing hanger means 15a and thereafter lowering them to both outsides of the set position of the floor panel $W_1$ while holding them in predetermined postures, and a pair of set jig means 15c, 15c for receiving the respective side panels $W_3$, $W_3$ from the respective lifter means 15b, 15b and combining the same with the floor panel $W_1$ from both lateral sides thereof. The drop lifter means 15b, 15b are supported on respective supporting posts 20, 20 provided on both outsides of the foregoing posts 19, 19 and are movable upwards and downwards.

Figure 8:
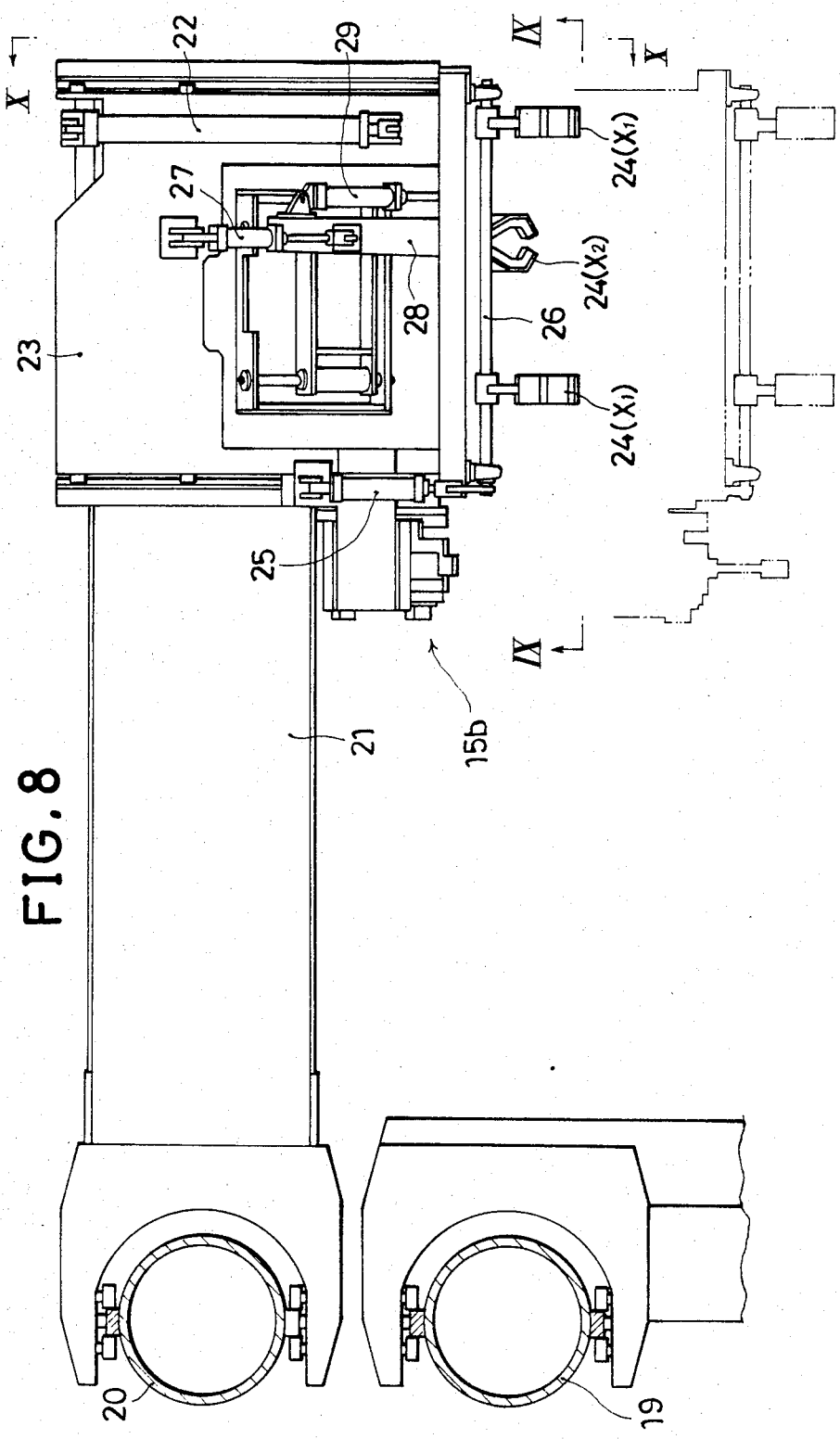
FIG. 8 is a sectional view taken along the line VIII—VIII in FIG. 7.
Figure 10:
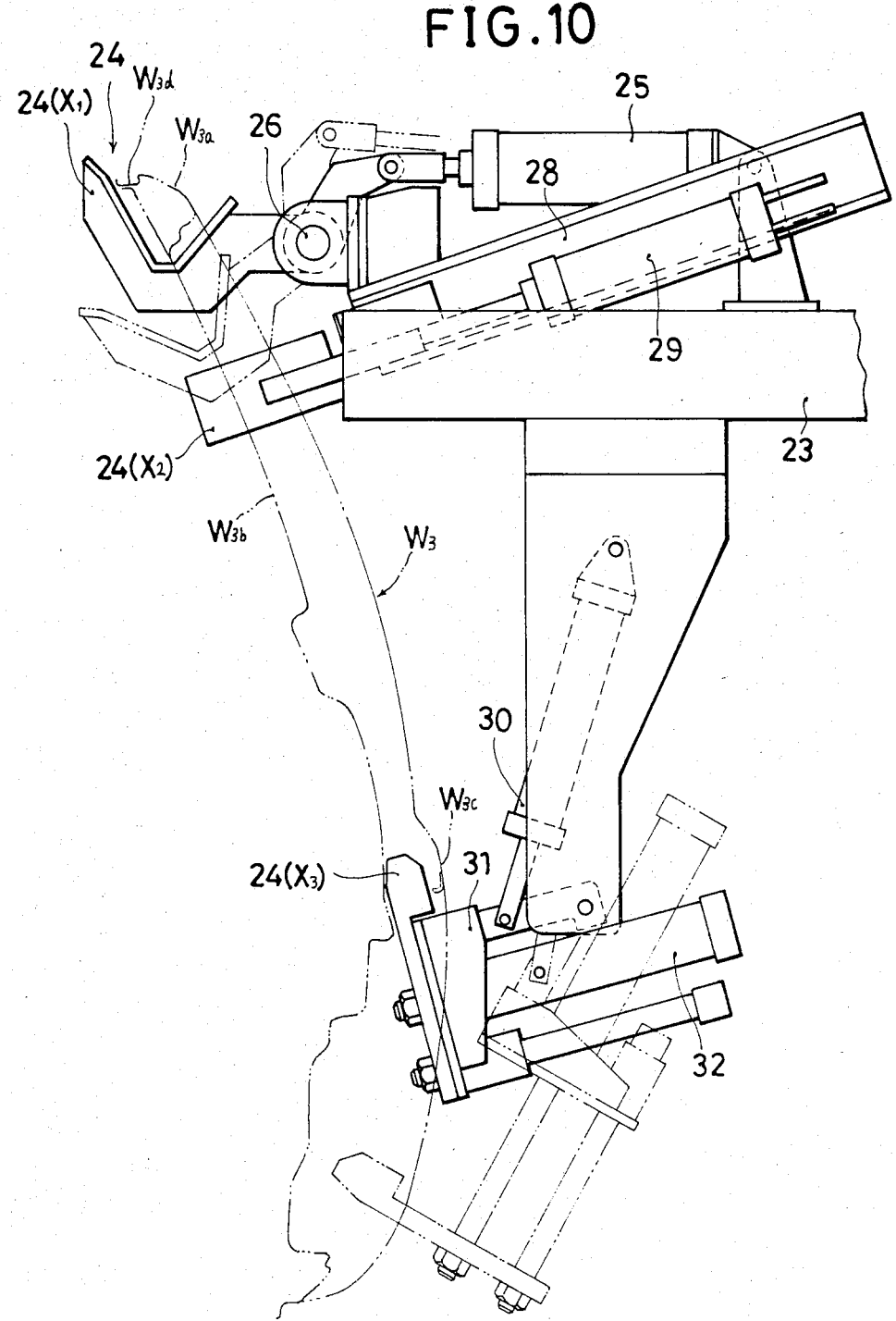
FIGS. 10 and 11 are respective views viewed from the lines X—X and XI—XI in FIG. 8.

More in detail, as shown in FIGS. 8-10, the lifter means 15b on each side includes an elevating frame 21 which is movable upwards and downwards along the supporting post 20. A movable frame 23 which is movable inwards and outwards by a cylinder 22 is mounted on the elevating frame 21. The movable frame 23 is provided with three groups of holding members 24 ($X_1$), 24 ($X_2$), 24 ($X_3$) for detachably holding proper portions of the side panel $W_3$ on each side. For instance, the roof side rail $W_{3a}$ on the upper portion thereof is held by holding member 24 ($X_1$), the center pillar $W_{3b}$ is held by holding member 24 ($X_2$), and the rear fender $W_{3c}$ is held by holding member 24 ($X_3$). The holding member 24 ($X_1$) for holding the roof side rail $W_{3a}$ is composed of a pair of front and rear fingers which are attached to a turnable shaft 26 on the movable frame 23. The shaft 26 is turnable by a cylinder 25 so that the fingers pick up the side panel $W_3$ from the corresponding hanger means 15a. The holding member 24 ($X_2$) for holding the center pillar $W_{3b}$ comprises a clamp member arranged to be opened and closed by a cylinder 29 and is provided on a forward end of an arm member 28. The arm member 28 is mounted on the movable frame 23 to be movable inwards and outwards in its inclined posture by a cylinder 27, so that the holding member operates to set the side panel $W_3$ in position in front and rear directions. The holding member 24 ($X_3$) for holding the rear fender $W_{3c}$ is movable to advance and retreat by action of a cylinder 32 provided on an arm member 31 which is mounted below a lower surface of a rear end portion of the movable frame 23. Arm member 31 is swingable upwards and downwards by a cylinder 30 so that the holding member can swing into the inside of the rear fender $W_{3c}$ for holding the rear fender $W_{3c}$ in a predetermined inwardly inclined posture.

Thus, the lifter means 15b on each side operates as follows: The movable frame 23 is advanced inwards. The side panel $W_3$ on each side is received from the hanger means 15a and is held in a predetermined posture by the respective holder members 24 ($X_1$)-($X_3$). The movable frame 23 is then retreated outwardly. The elevating frame 21 is lowered. At its lowered position, a lower edge of the side panel $W_3$ on each side is received by a tiltable receiving member 33 provided on the receiving base, as shown in FIG. 7. The side panel $W_3$ is transferred therefrom to the set jig means 15c on each side of the set carrier 1. The holder member 24 ($X_1$)–24 ($X_3$) are disengaged. The elevating frame 21 is lifted for being ready for the next side panel conveying operation.

As shown in FIGS. 4, 5 and 7, the set jig means 15c on each side is mounted on a mounting base 35 which is movable to advance and retreat inwards and outwards relative to the longitudinal axis of the apparatus. When the set jig means 15c is advanced inwards, the side panel $W_3$ on each side is received from the lifter means 15b by a holding member 36 provided on the set jig means 15c. After the lifter means 15b is lifted, the set jig means 15c is advanced further inwards so that the side panel $W_3$ may be combined with the floor panel $W_1$ mounted on the supporting members 17 on the set carrier 1 from the lateral outside thereof as mentioned before.

In this case, such a modification can be made in that the set jig means 15c can be omitted, the combination of the side panel $W_3$ with the floor panel $W_1$ may be carried out by the drop lifter means 15b.

The introducing means 16 for the roof panel as shown in FIG. 7, comprises a guide frame 37 provided on one lateral side of the setting station A. A set jig means 16b is supported on the frame 37 through a slidable frame 16a and is movable to advance and retreat inwards and outwards. A movable frame 16d having, at its front and rear end portions, roof clamp members 16c, 16c as shown in FIG. 5 is provided on the jig means 16b and is movable upwards and downwards. By lowering of the movable frame 16d, the roof panel $W_2$ may be inserted for setting from above, as clearly shown in FIG. 16, between receiving edges $W_{3d}$, $W_{3d}$ of the roof side rails $W_{3a}$, $W_{3a}$ of the two side panels $W_3$, $W_3$ combined with the floor panel $W_1$ as shown in FIG. 7.

Figure 11:
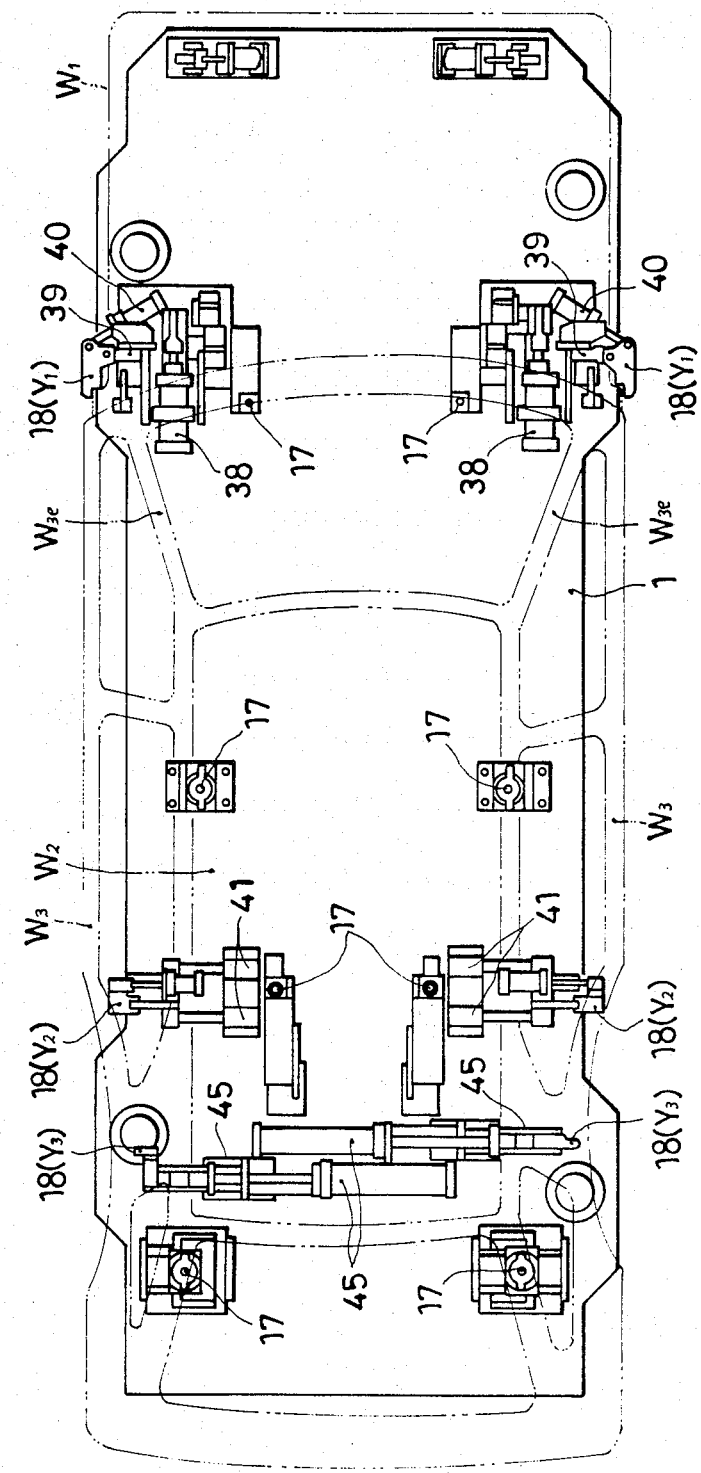
Figure 12:
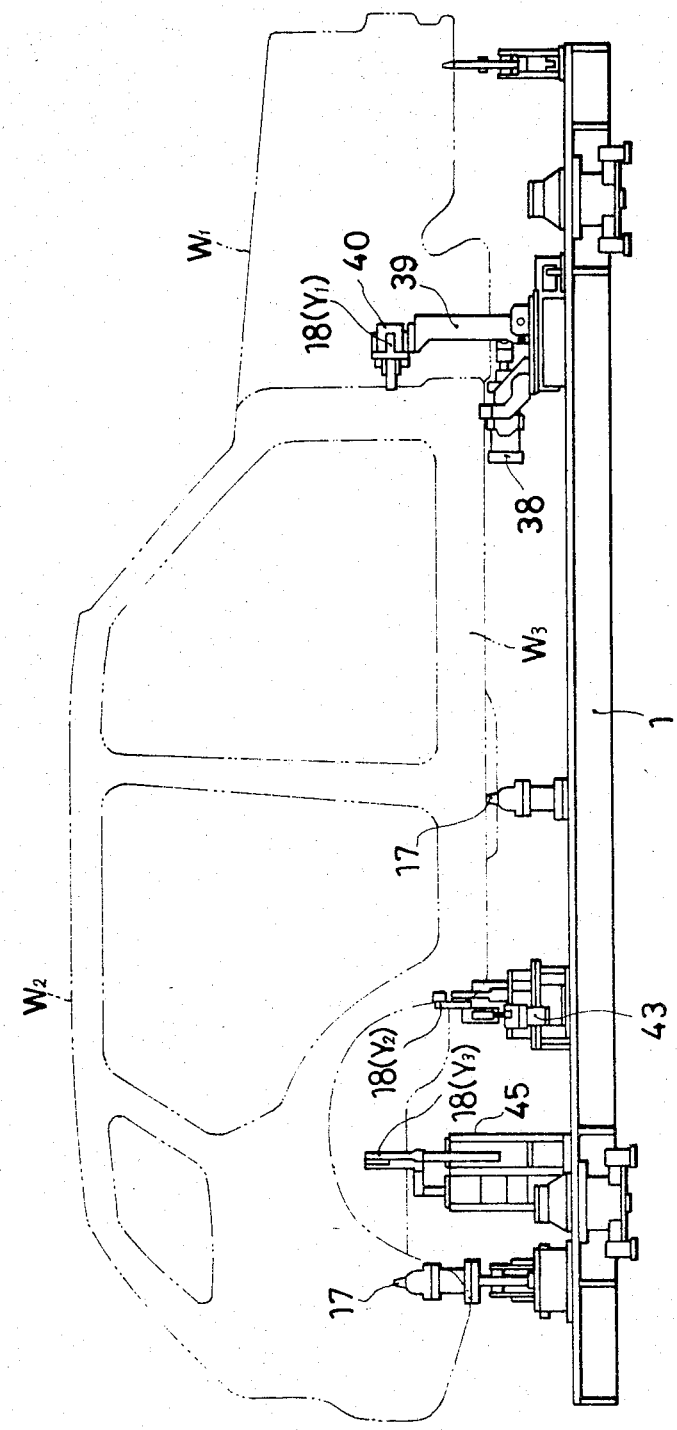
FIG. 12 is a side view thereof.

Side panel holding members 18 ($Y_1$)–18 ($Y_3$) are disposed on the set carrier 1 as shown in FIGS. 11 and 12. A first pair of right and left members 18 ($Y_1$) are at the front portion of the set carrier 1; a second pair of right and left members 18 ($Y_2$) are in the middle portion thereof; and a third pair of right and left members 18 ($Y_3$) are at the rear portion thereof. More in detail, each of the first pair of holding members 18 ($Y_1$), 18 ($Y_1$) at the front portion is attached, as shown in FIGS. 11–13, to a swingable arm 39 which is swingable upwards and downwards in front and rear directions by a cylinder 38 and is movable outwardly and inwardly by a cylinder 40. If the holding member 18 ($Y_1$) is moved inwardly when the arm 39 is raised, a lower end of the front pillar $W_{3c}$ of the side panel $W_3$ may be held thereby.

Each of the second pair of holding members 18 ($Y_2$), 18 ($Y_2$) at the middle portion is attached, as shown in FIG. 14, to a swingable arm 42 which serves also as a workpiece receiving member and is swingable inwards and outwards by a cylinder 43. The arm 42 is movable outwards and inwards by a cylinder 41. If arm 42 is moved inwardly when that the holding member 18 ($Y_2$) is raised, a rear end portion of a side sill $W_{3f}$ of the side panel $W_3$ may be held thereby.

Each of the holding members 18 ($Y_3$), 18 ($Y_3$) on the rear portion as shown in FIG. 15, is swingable inwards and outwards through a link mechanism 45 by a cylinder 44 so that the rear fender $W_{3c}$ of the side panel $W_3$ may be held thereby.

Thus, by these holding members 18 ($Y_1$)–18 ($Y_3$), the two side panels $W_3$, $W_3$ may be pressed against and fixed to the floor panel $W_1$ while the roof panel $W_2$ is held between the receiving upper edges $W_{3d}$, $W_{3d}$ thereof.

Next, the overall operation of this invention apparatus will be explained as follows:

Under the condition that the set carrier 1 is at the setting station A, the floor panel $W_1$ is placed on the floor panel holding members 17 on the set carrier 1, by the drop lifter means 14b of the floor panel introducing means 14. Next, the two side panels $W_3$, $W_3$ on both sides are held in a predetermined set posture and then combined with the floor panel $W_1$ from both outsides thereof, by the respective drop lifter means 15b, 15b and the respective set jig means 15c, 15c of the side panel introducing means 15. Thereafter, the roof panel $W_2$ is inserted in position from above between the receiving upper edges $W_{3d}$, $W_{3d}$ by being subjected to inward inclination forces of the two side panels $W_3$, $W_3$ caused by the foregoing pressing forces on the holding members 18 ($Y_1$)–($Y_3$) from both sides. Thus, the floor panel $W_1$, the roof panel $W_2$, and the two side panels $W_3$, $W_3$ are fixed in a predetermined set car body framework condition on the set carrier 1, even when the respective set jig means 15c, 16a are retreated outwards and upwards.

Thereafter, the set carrier 1 is moved from the setting station A to a welding station B, and is elevated at the welding position B, to the predetermined height position by the elevating pins 11. The welding jig means 2, 2 on both sides are advanced inwards, and the floor panel $W_1$ and the two side panels $W_3$, $W_3$ are clamped together. Additionally the roof panel $W_2$ and the two side panels $W_3$, $W_3$ are clamped together by the welding guns 4 provided on the welding jig means 2, 2. At the same time, the side panel holding members 18 ($Y_1$)–18 ($Y_3$) on the set carrier 1 are released from operation, so that the car body framework is transferred from the set carrier 1 to the welding jig means 2, 2. Thereafter, the set carrier 1 is lowered and is moved back to the setting station A so that while the car body frame-work is being welded at the welding station B, respective new components comprising the floor panel $W_1$, the two side panels $W_3$, $W_3$ and the roof panel $W_2$ are introduced for being set in position on the set carrier 1 in the same manner as above.

When the set carrier 1 is moved back to the setting station A, the discharging carrier 12 moves to the welding station B. After the completion of the welding, the discharging carrier 12 is moved upwards and downwards by the elevating pins 11. An assembled motorcar body thus formed is received on the discharging carrier 12, and is then moved outwards to the discharging station C while the set carrier 1 with a new car body framework assembled at the setting station is moved to the welding station B.

Figure 16:
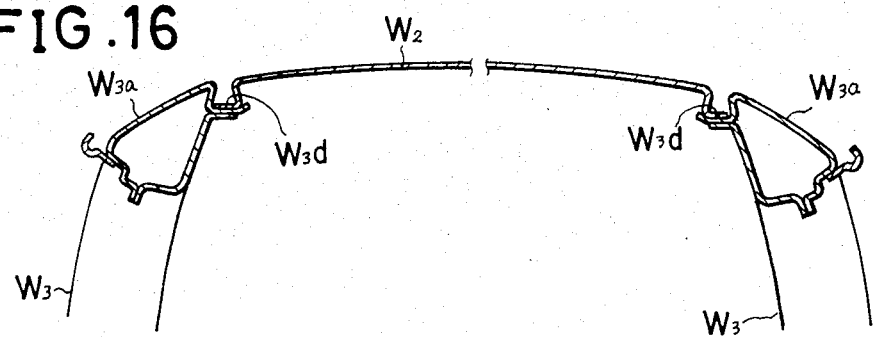
FIG. 16 is a sectional front view of engaging portions between a roof panel and side panels on both sides thereof.
Figure 19:
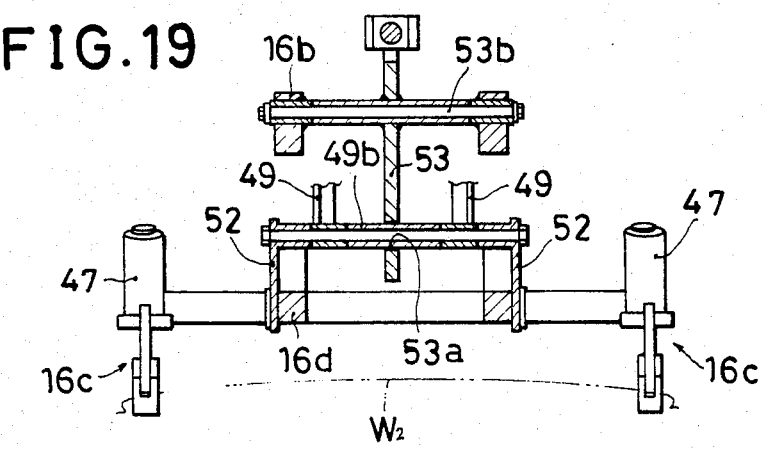
FIGS. 19 and 20 are sectional views taken along the lines XIX—XIX and XX—XX in FIG. 18, FIGS. 21 and 22 are side views of the same for explaining operations thereof.
Figure 20:
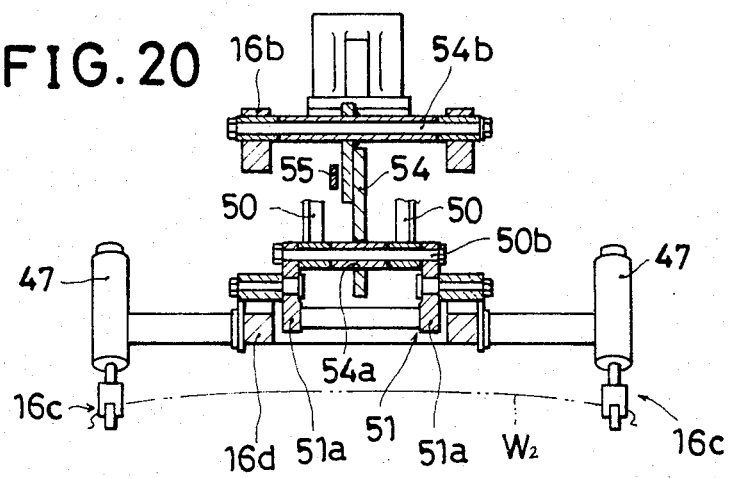

In the foregoing operation of the apparatus, in order to prevent the roof panel $W_2$ from getting out of position in the course of conveying the car body framework from the setting station A to the welding station B, it is preferable that the upper edge of the roof side rail $W_{3a}$ of the side panel $W_3$ on each side be inclined inwards to overhang the receiving edge $W_3$, as clearly shown in FIG. 16. Consequently, the overhung upper edges thereof prevent the roof panel $W_2$ from floating upwards.

This arrangement, however, creates the problem that it becomes impossible to simply insert the roof panel W₂ from above between the receiving edges W₃, W₃ of the two side panels W₃, W₃.

Accordingly, it is preferable that the movable frame 16d of the foregoing roof panel introducing means 16 be arranged to be able to incline so that the roof panel W₃ may be able to be wedged, in its inclined insertion manner, between the two receiving edges W₃, W₃ in successive insertion order from one end thereof in its longitudinal direction towards its other end thereof.

It can be considered in this case that elevating driving mechanisms operable independently are provided on the front and rear end portions of the movable frame 16d for controlling the inclination movement of the frame 16d. Such an arrangement creates a further disadvantage in that it makes a control system thereof complicated. Accordingly, in the illustrated example, there is presented the following arrangement in which the movable frame 16d is given any desired inclination movement by a single driving source:

This will be explained hereinafter with reference to FIGS. 17-22. Namely, the movable frome 16d is provided, at each of the front and rear end portions thereof, with a pair of arms 46, 46 projecting toward the right and left sides thereof. A pair of the foregoing roof clamp members 16c, 16c for clamping front and rear end ege portions of the roof panel W₂ are supported on each of these arms 46, 46. Each of these clamp members 16c, 16c on each side is arranged to open and close by a corresponding cylinder 47. Additionally, the clamp members 16c, 16c on either one of the front and rear ends of the movable frame 16d, for instance, those at the rear end portion (the left end portion in FIG. 17) are arranged to be operable to retreat rearwardly and upwardly by respective cylinders 48, 48.

In the illustrated example, the movable frame 16d is supported on the set jig means 16b through a pair of right and left links 49, 49 provided at a front end portion thereof and a pair of right and left links 50, 50 at a rear end portion thereof, and is movable upwards and downwards. Either one of the two pairs 49, 49, 50, 50 for instance, the pair of the links 50, 50 at the rear end portion are provided with respective joint portions 51, 51. Inclination of the movable frame 16d may be permitted.

More in detail, in the illustrated example, the links 49, 49 and the links 50, 50 are pivotally supported on respective supporting shafts 49a, 50a provided horizontally and laterally at front and rear portions of the set jig means 16b. The pair of links 49, 49 at the front end portion are supported at lower end portions thereof on a supporting shaft 49b provided horizontally and laterally between a pair of brackets 52, 52 provided right and left on the front end portion of the movable frame 16d, as shown clearly in FIG. 19. The links 50, 50 on the rear end portion are pivotally supported, at lower end portions thereof, on a supporting shaft 50b provided horizonally and laterally between a pair of small links 51a, 51a swingably provided right and left on the rear end portion of the movable frame 16d, as shown clearly in FIG. 20. The small links 51a, 51a constitute the foregoing joint portions 51, 51. Additionally, a pair of front and rear cam plates 53, 54 having respective cam grooves 53a, 54a in which the links 49, 49 and the links 50, 50 respectively are engaged, are swingably supported on the set jig means 16b. The two cam plates 53, 54 are interconnected through a connecting rod 55 so as to be swung by a single common driving source 56. In the illustrated example, more in detail, the cam plates 53, 54 are pivotally supported on respective supporting shafts 53b, 54b provided in front of the respective supporting shafts 49a, 50a on the front and rear end portions of the set jig means 16b, and respective shafts 49b, 50b provided at the lower ends of the links 49, 49. The lower ends of the links 50, 50 are passed through and brought in engagement with the corresponding cam grooves 53a, 54a. The driving source 56 comprises a cylinder which is connected to the cam plate 53 at the front end thereof and is provided on the set jig means 16b so that when driving source 56 is operated, the cam plate 53 at the front end thereof and additionally, through the connecting rod 55, the cam plate 4 at the rear end may be swung simultaneously in upper and lower directions.

The cam grooves 53a, 54a are formed so that the links 49, 49 at the front end and the links 50, 50 on the rear end are brought into parallel with one another when the two cam plates 53, 54 are in their elevated positions and in their lower positions. However, downward swing movements of the links 49, 49 at the front end are made prior to those of the links 50, 50 at the rear end in the course of the lowering movements of the cam plates 53, 54.

Figure 17:
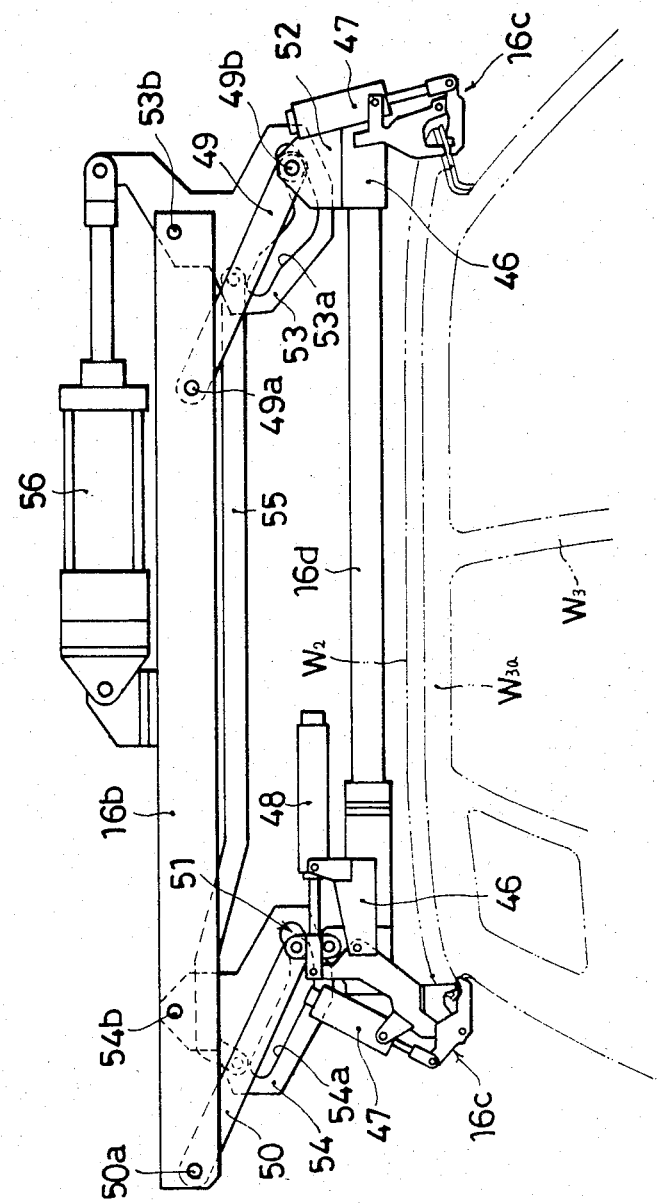
FIG. 17 is a sectional view of a set jig means portion of a roof panel introducing means thereof.
Figure 22:
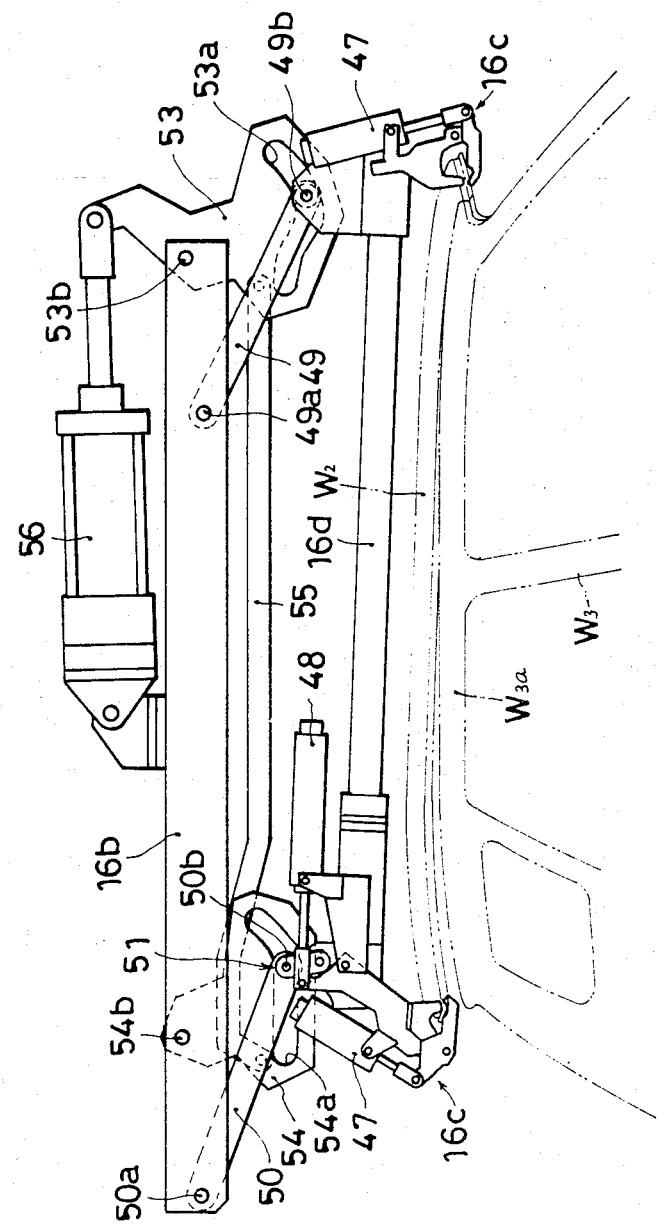

Next, the operation of the foregoing arrangement will be explained as follows:

If, from the condition that the cam plates 53, 54 are in their raised positions and accordingly the movable frame 16d is in its upper waiting position, as shown in FIG. 21, the two cam plates 53, 54 are swung downwards by operation of the driving source 56, the links 49, 49 at the front end swing downwards before the links 50, 50 at the rear portion, as shown in FIG. 22 in accordance with the shapes of the cam grooves 53a, 54a. Thus, the movable frame 16d is inclined in its forwardly lowered posture, and the roof panel W₂ supported thereon through the clamp members 16c is inserted first at its downwardly inclined front end portion between the overhung roof side rails W₃ₐ, W₃ₐ of the two side panels W₃, W₃. If, thereafter, the links 49, 49 at the front end are swung further downward to a predetermined lowered position and accordingly the downwardly inclined front end of the roof panel W₂ is brought into alignment with the front end edges of the side panel rails W₃ₐ, W₃ₐ, the links 49, 49 are brought into engagement with such an arc-shaped portion of the cam groove 53a of the cam plate 53 that is coaxial with the supporting shaft 53b. Successive lowering movement of the cam plate 53 keeps the links 49, 49 in their lowered positions and only the links 50, 50 at the rear end portion are lowered. Thus, finally the rear end portion of the roof panel W₂ is inserted between the overhung rails W₃ₐ, W₃ₐ as shown in FIG. 17. Thus, the overall length of the roof panel W₂ is inserted in position between the rail side panels W₃ₐ, W₃ₐ in inclined posture caused by the foregoing wedge insertion progressing from one end thereof toward the other end thereof. Consequently, the side edges of the roof panels W₂ can be placed on the receiving edges W₃d, W₃d under the condition that they are pressed by the overhung upper side rails W₃ₐ, W₃ₐ against thereon.

The above explanation has been made about the embodying example in which, the floor panel W₁, the side panels W₃, W₃ and the roof panels W₂ are introduced into the setting station A, and are combined together in a predetermined car body framework set on the carrier by means of the respective introducing means 14, 15, 16. It is, however, actually difficult for this embodiment to complete the foregoing setting operation before the completion of the welding. Consequently a certain loss of time, that is, a pause between the two operations, still occurs. Therefore, it is desirable to remove such a loss of time in order to further improve the productivity of the assembled car bodies.

Figure 23:
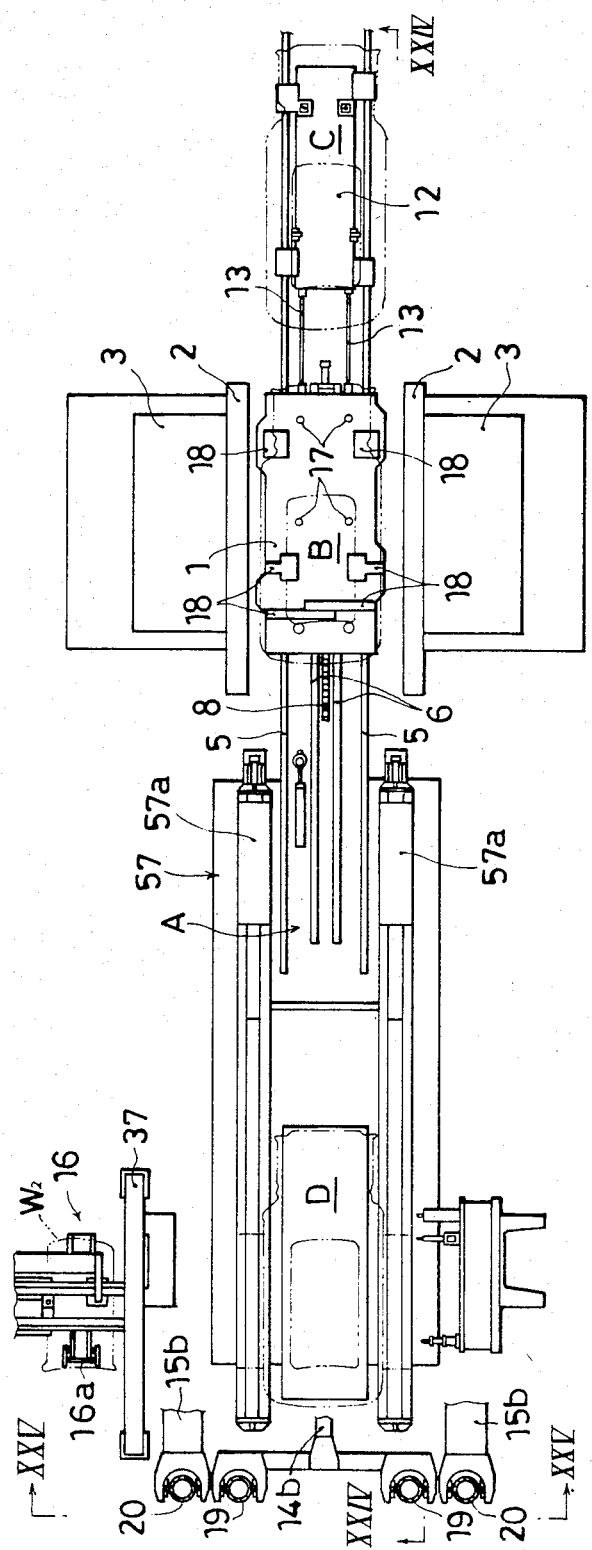
FIG. 23 is a top plan view of a second embodiment of this invention.

A second embodiment of this invention as shown in FIG. 23 and the subsequent Figures can meet this desire. The same will be explained as follows:

There is provided a presetting station D in rear of the setting station A. Respective introducing means 14, 15, 16 for introducing the floor panel $W_1$, the two side panels $W_3$, $W_3$ and the roof panel $W_2$ and combining them together in a predetermined car body frame work set thereon in almost the same manner as in the foregoing example are disposed at the presetting station D. A transfer means 57 is able to reciprocate between the presetting station D and the setting station A so that the floor panel $W_1$, the two side panels $W_3$, $W_3$ and the roof panel $W_2$ may be conveyed while kept in such a car body framework set condition, by means of the transfer means 57, to the set carrier 1 which is waiting at the setting station A, for being set thereon as they are.

The set carrier, 1, the welding jig means 2, and the respective introducing means 14, 15, 16 in the second emodiment are almost equal in construction to those in the foregoing first example, and accordingly detailed explanations thereof are omitted. A preset jig means 58 having plural positioning members 58a for positioning and holding the floor panel $W_1$ as shown in FIG. 24 is provided at the presetting station D.

The foregoing transfer means 57 comprises a pair of units 57a, 57a which are disposed on both sides of a line extending between the setting station A and the presetting station D and are able to reciprocate and move upwards and downwards. The units 57a, 57a are provided with respective holding members 59 for positioning and fixing from both lateral sides the floor panel $W_1$, the two side panels $W_3$, $W_3$ and the roof panel $W_2$ in their predetermined set conditions. Synchronizing mechanisms 60, 61 are provided for elevating and lowering and for reciprocating the two units 57a, 57a synchronously one with another.

Figure 24:
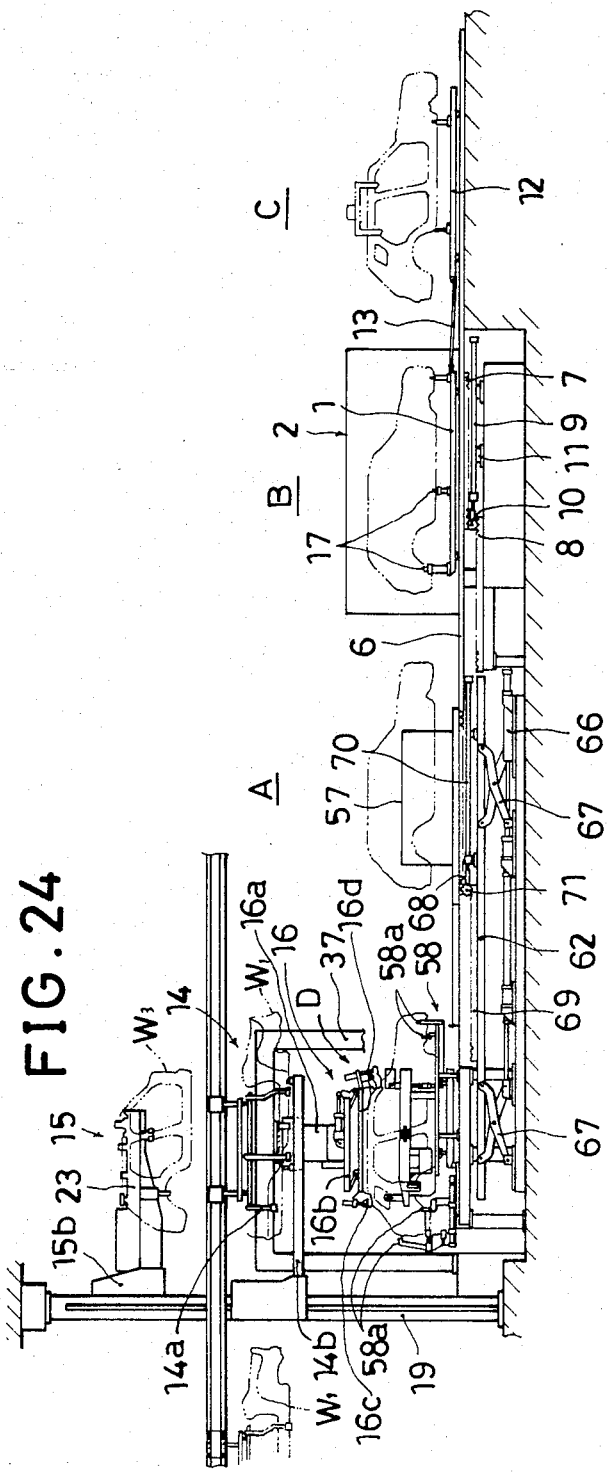
FIGS. 24 and 25 are respective views viewed from the lines XXIV—XXIV and XXV—XXV in FIG. 23.
Figure 25:
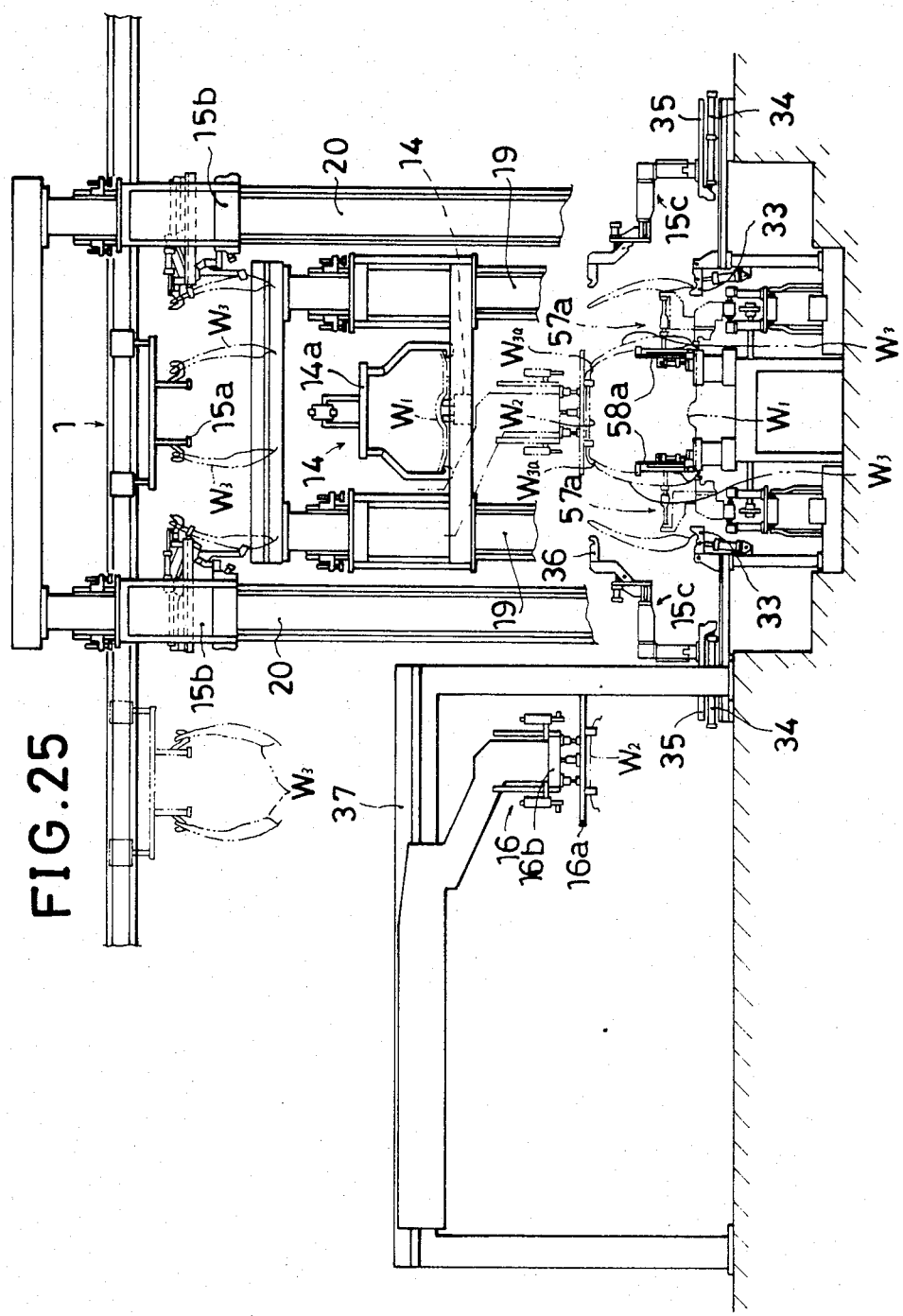
Figure 28:
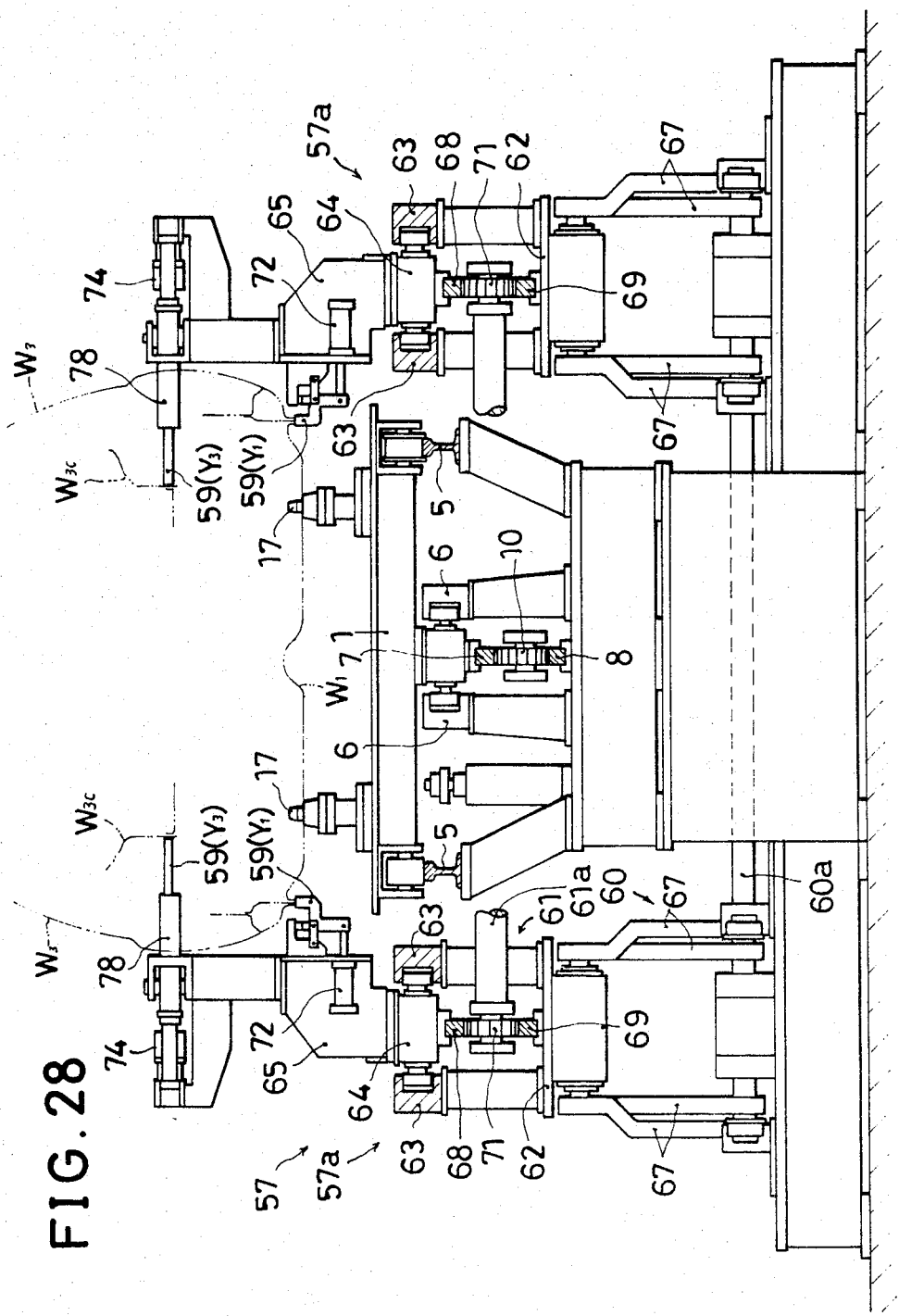

More in detail, the unit 57a on each side is constructed of a supporting base 64 movably supported, as shown in FIG. 28, between a pair of guide rails 63, 63 provided on an elevating base 62 which is provided on the corresponding side of the foregoing line so as to extend between the setting station A and the presetting station D, as shown in FIG. 24. Jig means 65 having the foregoing holding member 59 are provided on the supporting base 64. The elevating bases 62 on each side, as shown in FIG. 24, are arranged to be elevated and lowered in parallel by a pair of front and rear X link mechanisms 67, 67 which are operable by a cylinder 66. In order to ensure that the elevating bases 62, 62 on both sides may be elevated and lowered synchronously one with another, the X link mechanisms 67, 67 and 67, 67 of the two elevating basis 62, 62 are interconnected through a synchronizing bar 60a. Thus there is constructed the foregoing synchronizing mechanism 60 for elevating and lowering movements.

The supporting base 64 on each side is provided on its lower side with a first rack bar 68. A second rack bar 69 opposing to the same is fixed to the elevating base 62. A pinion 71 connected to a cylinder 70 is interposed between and is brought into engagement with the rack bars 68, 69 so that when the cylinder 70 is operated, the supporting bases 64 are reciprocated between the setting station A and the presetting station D. Additionally, in order that the supporting bases 64, 64 on both sides are reciprocated synchronously one with another, the respective pinions 71, 71 for these supporting bases 64, 64 are interconnected through a synchronizing bar 61a. Thus there is constructed the foregoing synchronizing mechanism 61 for the reciprocating movements.

Figure 26:
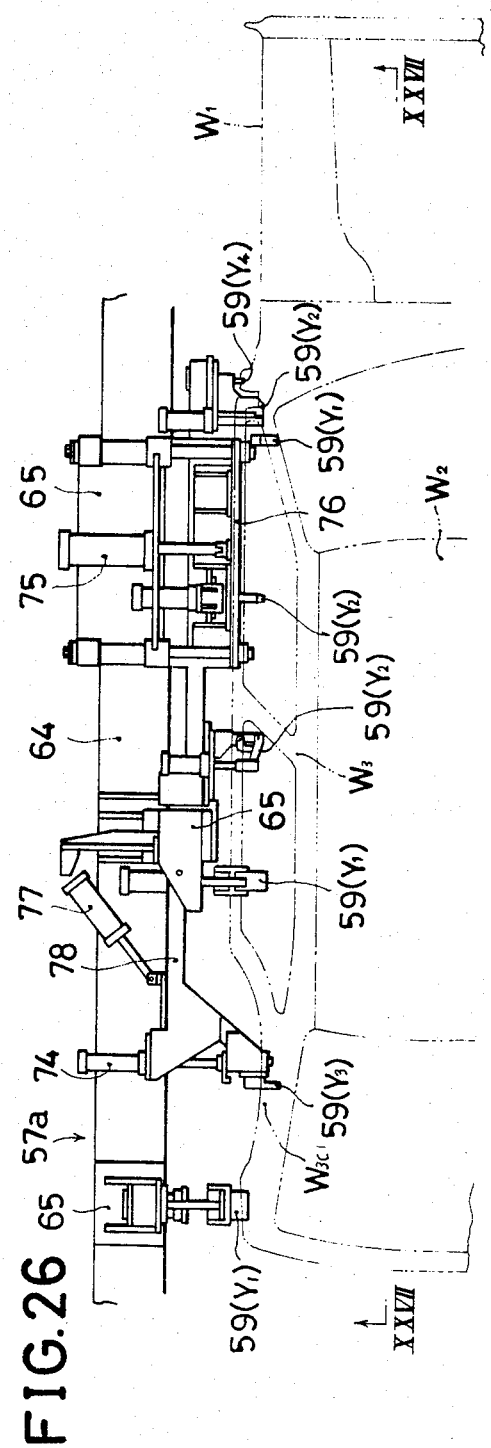
FIG. 26 is a top plan view of a transfer means portion thereof.
Figure 29:
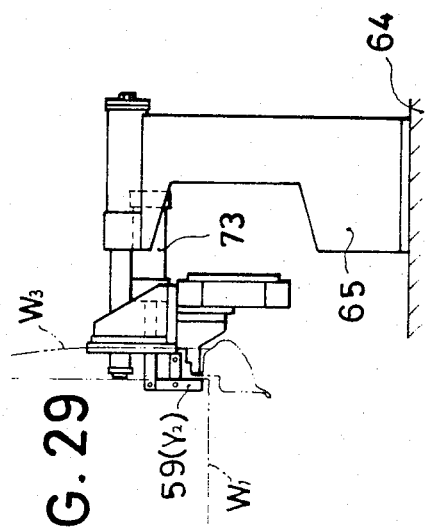

As shown in FIGS. 26 and 27, the foregoing jig means 65 on the unit 57a on each side are composed of three groups disposed at the front portion, at the middle portion and at the rear portion. The foregoing holding members are composed of those of four types 59 ($Y_1$)–59 ($Y_4$). That is, a first type thereof which is denoted by 59 ($Y_1$) is arranged to be operated by a cylinder 72 for supporting both the floor panel $W_1$ and the side panel $W_3$ from below as shown clearly in FIG. 28. A second type thereof which is denoted by 59 ($Y_2$) is arranged to be operated to open and close by a cylinder 73 for clamping those panels $W_1$ and $W_3$ at a proper position as shown clearly in FIG. 29. A third type thereof which is denoted by 59 ($Y_3$) is arranged to be operated to advance and retreat laterally by a cylinder 74 for pushing the rear fender $W_{3c}$ of the side panel $W_3$ inwards, as shown clearly in FIG. 28. A fourth kind thereof which is denoted by 59 ($Y_4$) is arranged to be mounted, for positioning, in a door hinge attaching opening made in the front pillar $W_{3e}$ of the side panel $W_3$.

A movable frame 75 which is movably provided on the front jig means 65 to advance and retreat in the lateral direction by a cylinder 75 is provided with a single one 59 ($Y_1$) of the holding members 59, a single one 59 ($Y_4$) of the holding members 59, and a single one 59 ($Y_2$) of the holding members 59. The middle jig means 65 is provided with a single one 59 ($Y_1$) of the holding members 59, on a single one of the holding members 59 ($Y_3$) which is provided on a forward end of a swingable arm 78 provided with a single one 59 ($Y_1$) of the holding members 59.

Thus, if these holding members 59($Y_1$)–59 ($Y_4$) are operated, the floor panel $W_1$, the two side panels $W_3$, $W_3$ and the roof panel $W_2$ combined together in a predetermined car body framework set on the presetting station D may be firmly held in such a car body framework from both sides thereof.

Now, the overall operation of this embodying example of this invention apparatus will be explained more in detail as follows:

First, the floor panel $W_1$ is introduced in and set on the preset jig means 58 of the presetting station D by means of the introducing means 14. Next the two side panels $W_3$, $W_3$, are introduced to be combined with the floor panel from both sides by means of the introducing means 15. Thereafter the roof panel $W_2$ is introduced from above and is combined with the upper edges of the side walls $W_3$, $W_3$ by means of the introducing means 16 so as to form a car body framework. The car body framework thus set thereon is firmly held from both sides thereof by the respective holding members 59 ($Y_1$)–59 ($Y_4$) of the respective units 57a, 57a previously moved back from the setting station A to the presetting station D. Thereafter, the two units 57a, 57a are raised synchronously one with another so as to detach the car body framework from the preset jig means 58, and additionally the two units 57a, 57a are advanced to the setting station A synchronously one with another. Then the two units 57a, 57a are lowered at the setting station A synchronously one with another, and thereby the car body framework is set on the set carrier 1 which is now waiting at the setting station A.

Then, the car body framework is firmly held on the set carrier 1 by means of the floor panel and side panel holding member 17, 18 provided on the set carrier 1. Thereafter the respective holding members 59 ($Y_1$)–($Y_4$) of the two units 57a, 57a are released from holding operation, and the set carrier 1 is advanced to the welding station B, so that the car body framework is transferred to the welding jig means 2, 2 and is subjected to the welded operation thereby.

In this example, a new panel presetting operation is carried out at the presetting station D immediately after the car body framework is conveyed from the station D to the setting station A by the transfer means 57, so that as compared with the first above-mentioned example wherein the new panel setting operation is carried out after the set carrier 1 is moved back from the welding station B to the setting station A, the panel setting operation in this example can be completed faster by the amount of time required for the reciprocating movement of the set carrier 1 between the setting station A and the welding station B. Consequently, the next car body framework can be conveyed to the welding station immediately after the completion of the welding operation on the earlier car body framework by the welding jig means 2, without any loss of time.

Thus, according to this invention, as set carrier is provided with side panel holding members for pressing against and fixing to a floor panel side panels on both sides thereof so that a roof panel may be held between receiving upper edges of the two side panels. The floor panel, the roof panel and the side panels may be conveyed, under their car body framework set on the set carrier, from a setting station to a welding station and further may be transferred, while they are kept in the car body framework condition, to welding jig means provided at the welding station. Consequently it becomes possible that, during the welding operation at the welding station, the set carrier is moved back to the setting station and new panels are introduced thereinto and set and combined together on the set carrier for being ready for the next welding. Thereby, as compared with the foregoing co ventional apparatus wherein it is inevitable to set side panels on the welding jig means after completion of the welding operation, a loss of time between the setting operation and the welding operation can be decreased and the productivity can be increased. Additionally, a large line space as required in the case where plural set carriers are circulated in the form of a loop is not required. Costs for installation of the apparatus can be lowered.

It is readily apparent that the above-described assembly apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling a motorcar body including a set carrier able to reciprocate between a setting station and a welding station in front thereof, the welding station having on both sides thereof welding jig means for connecting by welding side panels to a floor panel and a roof panel, characterized in that the set carrier is provided with floor panel holding members for positioning and supporting the floor panel, side panel holding members for pressing the side panels against and fixing the side panels to the floor panel with the roof panel solely being held between receiving upper edges of the side panel thereby forming a predetermined car body frame work, so that the side panels, the roof panel and the floor panel can be conveyed from the setting station to the welding station as said predetermined car body framework set on the set carrier, and the car body framework may be transferred as it is to the welding jig means at the welding station.

2. An apparatus according to claim 1, wherein there ar provided respective introducing means for introducing the floor panel, two side panels and the roof panel, respectively, and combining those panels together into a car body framework set on the carrier.

3. An apparatus according to claim 2, wherein the introducing means for the roof panel includes a set jig means thereon having a movable frame which is adapted to be movable upwards and downwards, said moveable frame having at its front and rear end portions respective roof panel clamp members so that, by a lowering movement of the movable frame, the roof panel may be inserted in position from above between the receiving upper edges of the two side panels, and wherein the movable frame is arranged to incline so that the roof panel may be wedged in successive order from its one end in the longitudinal direction thereof towards its other end, between the receiving upper edges of the two side panels.

4. An apparatus according to claim 3, wherein the movable frame includes means for moving upwards and downwards in relation to the set jig means comprising a pair of link means on front and rear ends thereof, one of the two link means being provided with a joint portion so that the movable frame may be allowed to incline, and a pair of front and rear cam plates having respective cam grooves which are in engagement with the respective link means said cam plates being pivotally supported on the set jig means, and wherein the two cam plates are interconnected through a connecting rod and are arranged to be moved to swing by a single common driving source so that the respective link means may be given respective swing movements according to the shapes of the respective cam grooves.

5. An apparatus according to claim 2, wherein a presetting station is provided in rear of the setting station, and the respective introducing means are disposed at the presetting station, and wherein a transfer means is provided which is adapted to reciprocate between the presetting station and the setting station so that the floor panel, the two side panels and the roof panel combined together into a car body framework set at the presetting station by means of the respective introducing means may be conveyed, under their set condition, to the set carrier waiting at the setting station.

6. An apparatus according to claim 5, wherein the transfer means is composed of a pair of units which are disposed on both sides of a line connecting between the setting station and the presetting station and are adapted to reciprocate between the setting station and the presetting station and be movable upwards and downwards, and said units are provided with holding members for positioning and fixing from both sides thereof the floor panel, the two side panels and the roof panel under a predetermined set condition, and said transfer means further includes synchronizing means for ensuring that the two units reciprocate and move upwards and downwards synchronously with one another.

7. An apparatus according to claim 5, wherein the transfer means is composed of a pair of units which are disposed on both sides of a line connecting between the setting station and the presetting station and are adapted to reciprocate between the setting station and the presetting station and be movable upwards and downwards, and said units are provided with holding members for positioning and fixing from both sides thereof the floor panel, the two side panels and the roof panel under a predetermined set condition, and said transfer means further includes synchronizing means for ensuring that the two units reciprocate and move upwards and downwards synchronously with one another.

* * * * *